(12) United States Patent
Cheekatamarla

(10) Patent No.: US 12,504,166 B2
(45) Date of Patent: Dec. 23, 2025

(54) FUEL FLEXIBLE COMBUSTION MODULE WITH INTEGRAL FLASHBACK ARRESTOR

(71) Applicant: UT-BATTELLE, LLC, Oak Ridge, TN (US)

(72) Inventor: Praveen Kumar Cheekatamarla, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 379 days.

(21) Appl. No.: 18/139,670

(22) Filed: Apr. 26, 2023

(65) Prior Publication Data

US 2023/0349550 A1 Nov. 2, 2023

Related U.S. Application Data

(60) Provisional application No. 63/337,200, filed on May 2, 2022.

(51) Int. Cl.
*F23D 14/14* (2006.01)
*F23D 14/82* (2006.01)

(52) U.S. Cl.
CPC ........... *F23D 14/145* (2013.01); *F23D 14/82* (2013.01); *F23D 2203/102* (2013.01)

(58) Field of Classification Search
CPC ... F23D 14/145; F23D 14/82; F23D 2203/102
USPC ........................................................ 431/346
See application file for complete search history.

(56) References Cited

U.S. PATENT DOCUMENTS

| 3,155,142 A | * | 11/1964 | Stack | F23C 99/00 |
| | | | | 431/328 |
| 2012/0164590 A1 | * | 6/2012 | Mach | F23D 14/82 |
| | | | | 431/328 |
| 2016/0298838 A1 | * | 10/2016 | Karkow | F23D 14/26 |

FOREIGN PATENT DOCUMENTS

| CN | 109869717 B | 5/2020 |
| KR | 100522435 B1 | 10/2005 |
| KR | 100573310 B1 | 4/2006 |
| KR | 101063759 B1 | 9/2011 |

OTHER PUBLICATIONS

Zhao et al: "Influence of hydrogen addition to pipeline natural gas on the combustion performance of a cooktop burner", International Journal of Hydrogen Energy, 2019. 44(23): p. 12239?12253.

* cited by examiner

*Primary Examiner* — Avinash A Savani
(74) *Attorney, Agent, or Firm* — Fox Rothschild LLP

(57) ABSTRACT

A burner includes a primary input port configured to receive hydrogen-containing fuel and primary oxygen-containing gas. A fuel-distribution element comprises a plurality of distribution openings. A flashback arrestor element comprises a plurality of flashback arrestor element channels with a mean width that is smaller than a critical flame quench diameter of the hydrogen-containing fuel. A burner housing can be provided, and the burner housing, fuel distribution element, and flashback arrestor element can be made of plastic and by 3D printing. A combustion element includes a plurality of combustion element apertures configured to cause the burner to produce a flame and/or infrared heat, wherein a mean width of the combustion element apertures is 2-4 times larger than the mean width of the flashback arrestor element channels. A method of heating and a heating system are also disclosed. The combustion element can also be equipped for resistive heating.

34 Claims, 23 Drawing Sheets

FUEL FLEXIBLE COMBUSTION MODULE WITH INTEGRAL FLASHBACK ARRESTOR

CROSS-REFERENCE TO RELATED APPLICATIONS

This application claims priority to U.S. Provisional Application No. 63/337,200 filed on May 2, 2022, entitled "Fuel Flexible Combustion Module with Integral Flashback Arrestor", the entire disclosure of which is incorporated herein by reference.

STATEMENT REGARDING FEDERALLY SPONSORED RESEARCH AND DEVELOPMENT

This invention was made with government support under Contract No. DE-AC05-00OR22725 awarded by the United States Department of Energy. The government has certain rights in this invention.

FIELD OF THE INVENTION

The present invention relates generally to burners, and more particularly to burners incorporating hydrogen gas as fuel source.

BACKGROUND OF THE INVENTION

Combustion system design and burner configuration play vital roles in the overall performance of any heating system. Feed preparation, composition and supply to the burner are equally important in reliable and safe operation of the burner, otherwise autoignition and flashback scenarios can compromise the burner performance. Energy conversion efficiency, fuel flexibility, emissions, reliability, safety, and longevity rely on the efficacy of the combustion process.

Hydrogen is considered as an energy storage and carrier medium which enables intermittent renewable energy integration with the grid infrastructure. This allows utilization of existing fuel fired equipment while decreasing the carbon footprint. This aspect helps to identify the significance of the need for, and a background regarding the interest in, hydrogen-based fuels.

Currently available burners are incompatible with hydrogen and/or its blends (at hydrogen concentrations above 20%) with natural gas. See for example Zhao, Y., McDonell, V., & Samuelsen, S. (2019) "*Influence of hydrogen addition to pipeline natural gas on the combustion performance of a cooktop burner*", International Journal of Hydrogen Energy, 44 (23), 12239-12253. The high flame velocity of a hydrogen enriched natural gas burner also makes it susceptible to flashback, thus creating a safety hazard. A primary limiting factor includes flashback of the feed mixture leading to catastrophic failure of the burner. Flame stability is another challenge associated with broad variations in fuel composition between 0%-100% hydrogen concentrations in natural gas.

Conventional flame burners also lead to high nitrogen oxide ($NO_x$) emissions due to the extreme adiabatic flame temperature (AFT). The presence of hydrogen in natural gas further increases the AFT, creating a safety hazard. Recent studies have established the risk of flashback at hydrogen concentrations starting at 20%. Studies have established that hydrogen concentrations beyond 20% require significant modifications for addressing emissions and safety aspects.

SUMMARY OF THE INVENTION

A burner includes a primary input port configured to receive hydrogen-containing fuel and primary oxygen-containing gas wherein the hydrogen-containing fuel comprises $H_2$ and hydrocarbon gas, such that the $H_2$ has a molar concentration of $0<H_2 \leq 100\%$. A fuel-distribution element is fluidly coupled with the input port, wherein the fuel-distribution element comprises a plurality of distribution openings configured to distribute the primary oxygen-containing gas and the hydrogen-containing fuel through the plurality of distribution openings. A flashback arrestor element is disposed downstream from the fuel distribution element. The flashback arrestor element comprises a plurality of flashback arrestor element channels configured to guide the primary oxygen-containing gas and hydrogen-containing fuel from the fuel-distribution element through the burner. A mean width of the flashback arrestor element channels is smaller than a critical flame quench diameter of the hydrogen-containing fuel. A combustion element is disposed downstream from the flashback arrestor element and is arranged to form an interface of the burner with ambient air. The combustion element comprises a plurality of combustion element apertures configured to output the primary oxygen-containing gas and the hydrogen-based fuel from inside to outside of the burner, to cause the burner to produce a flame and/or infrared heat. A mean width of the combustion element apertures is 2-4 times larger than the mean width of the flashback arrestor element channels. The oxygen-containing gas can be air.

The flashback arrestor element can comprise ceramic or plastic materials. The ceramic materials can include at least one selected from the group consisting of cordierite, mullite, alumina, and silica-alumina. The plastic materials can include at least one selected from the group consisting of polyetherimide, polyether ether ketone, polyamide, polyimide, fluorinated ethylene propylene copolymer, polybenzimidazole, glass fiber reinforced polyphenylenesulfide, and polytetrafluoroethylene.

The flashback arrestor element channels can have a mean width of 200-600 µm. The mean width of the flashback arrestor element channels can be from 200 to 1000 µm. The flashback arrestor element channels in cross section have a shape that is at least one selected from the group consisting of square, circular, pentagonal or triangular. The length of the flashback arrestor element channels can be from 0.25 to 0.5 inches. The flashback arrestor element can comprise a ceramic with a thermal conductivity of from 1.5 to 10 W/mK or plastic with a thermal conductivity of from 0.1 to 0.5 W/mK. The cells per square inch (CPSI) for the flashback arrestor element channels can be 200-400 CPSI.

The combustion element can comprise catalytic material to suppress undesired emissions. The catalytic material can include at least one selected from the group consisting of include platinum, palladium, rhodium, $Mn_2O_3$, CuO, $Cr_2O_3$, and $Mn_3O_4$. The combustion element can include surface catalytic metal oxides. The surface catalytic metal oxides can include at least one selected from the group consisting of NiCrAl, NiCr, FeCrAl, and FeNi. The thickness of the combustion element can be from 1 mm to 2 mm. Other dimensions are possible. The combustion element can comprise a material having an emissivity that is ≥0.75. The combustion element can comprise a material having an emissivity of from 0.75 to 0.92.

The fuel-distribution element, the flashback arrestor element, and the combustion element can be arranged in a planar configuration. The fuel-distribution element, the flashback arrestor element, and the combustion element can be arranged in a concentric configuration. The concentric configuration can be tubular.

The burner can include a burner housing. The primary air input port, the fuel distribution element, the flashback arrestor element, and the combustion element can be disposed in the burner housing. The burner housing can comprise at least one selected from the group consisting of metal and plastic. The primary air input port, the fuel distribution element, and the flashback arrestor element can include at least one selected from the group consisting of ceramic and plastic.

The burner housing, the fuel distribution element, and the flashback arrestor element can comprise plastic with upper working temperatures in the range of 180-360° C. and thermal conductivity in the range of 0.1-0.5 W/mK. The burner housing, the fuel distribution element, and the flashback arrestor element can comprise at least one selected from the group consisting of polyetherimide, polyether ether ketone, polyamide, polyimide, fluorinated ethylene propylene copolymer, polybenzimidazole, glass fiber reinforced polyphenylenesulfide, and polytetrafluoroethylene.

The fuel distribution element channels, the flashback arrestor channels, and the combustion element channels can have varying sizes and shapes. The channels can be straight channels. The channels can be tortuous channels.

The burner can include a secondary flashback arrestor element disposed inside the burner downstream from the flashback arrestor element and upstream from the combustion element. A secondary oxygen-containing gas input port can be configured to receive secondary oxygen-containing gas between the combustion element and the secondary flashback arrestor element. The secondary flashback arrestor element comprises a plurality of secondary flashback arrestor element channels configured to guide the primary oxygen-containing gas and the hydrogen-based fuel from the flashback arrestor element through the burner, wherein a mean width of the secondary flashback arrestor element's channels is 1.5-2 times larger than the mean width of the flashback arrestor element channels. The secondary flashback arrestor element can comprise ceramic materials.

The CPSI of the secondary flashback arrestor element channels can be between 100-300 CPSI. The mean width of the secondary flashback arrestor channels can be between 1.5-2 times the mean width of the flashback arrestor element channels. The thickness of the secondary flashback arrestor element can be from 0.25 and 0.5 inches.

The distance between the combustion element and the flashback arrestor element can be from 0.5 to 1 inches. The distance between the flashback arrestor element and the secondary flashback arrestor element can be from 0.25 to 0.5 inches.

The hydrocarbon gas can be at least one selected from the group consisting of natural gas, methane, propane, butane and biogas. The burner can be attached to at least one selected from the group consisting of stoves, hot water tanks, furnaces, ovens, boilers, industrial heating systems, and industrial drying systems.

The combustion element can include an electrically conductive material. Electrical contacts can be electrically connected to the combustion element. An electrical power circuit can be connected to the electrical contacts. An electrical power source can provide power to the electrical power circuit. A processor can be provided for controlling the flow of power through the electrical power circuit.

A method of heating includes the step of providing a burner comprising a primary input port configured to receive hydrogen-containing fuel and primary oxygen-containing gas, wherein the hydrogen-containing fuel comprises $H_2$ and hydrocarbon gas, such that the $H_2$ has a molar concentration of $0<H_2\leq100\%$. A fuel-distribution element fluidly is coupled with the input port, wherein the fuel-distribution element comprises a plurality of distribution openings configured to distribute the primary oxygen-containing gas and the hydrogen-containing fuel through the plurality of distribution openings. A flashback arrestor element is disposed downstream from the fuel distribution element, wherein the flashback arrestor element comprises a plurality of flashback arrestor element channels configured to guide the primary oxygen-containing gas and hydrogen-containing fuel from the fuel-distribution element through the burner, wherein a mean width of the flashback arrestor element channels is smaller than a critical flame quench diameter of the hydrogen-containing fuel. A combustion element is disposed downstream from the flashback arrestor element and arranged to form an interface of the burner with ambient air, wherein the combustion element comprises a plurality of combustion element apertures configured to output the primary air and the hydrogen-based fuel from inside to outside of the burner, to cause the burner to produce a flame and/or infrared heat, wherein a mean width of the combustion element apertures is 2-4 times larger than the diameter of the flashback arrestor element channels. The method further includes the step of directing primary oxygen-containing gas and a hydrogen-containing fuel comprising $H_2$ and a hydrocarbon gas to the primary input port. The primary oxygen-containing gas and the hydrogen-containing fuel are combusted to generate heat at the combustion element.

A heating system includes a burner comprising a primary input port configured to receive hydrogen-containing fuel and primary oxygen-containing gas, wherein the hydrogen-containing fuel comprises $H_2$ and hydrocarbon gas, such that the $H_2$ has a molar concentration of $0<H_2\leq100\%$. A fuel-distribution element is fluidly coupled with the input port, wherein the fuel-distribution element comprises a plurality of distribution openings configured to distribute the primary oxygen-containing gas and the hydrogen-containing fuel through the plurality of distribution openings. A flashback arrestor element is disposed downstream from the fuel distribution element, wherein the flashback arrestor element comprises a plurality of flashback arrestor element channels configured to guide the primary oxygen-containing gas and hydrogen-containing fuel from the fuel-distribution element through the burner, wherein a mean width of the flashback arrestor element channels is smaller than a critical flame quench diameter of the hydrogen-containing fuel. A combustion element is disposed downstream from the flashback arrestor element and arranged to form an interface of the burner with ambient air, wherein the combustion element comprises a plurality of combustion element apertures configured to output the primary oxygen-containing gas and the hydrogen-containing fuel from inside to outside of the burner, to cause the burner to produce a flame and/or infrared heat, wherein a mean width of the combustion element apertures is 2-4 times larger than the diameter of the flashback arrestor element channels. The heating system further comprises a source of hydrogen-containing fuel and possibly also a source of primary oxygen-containing gas connected to the input port.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
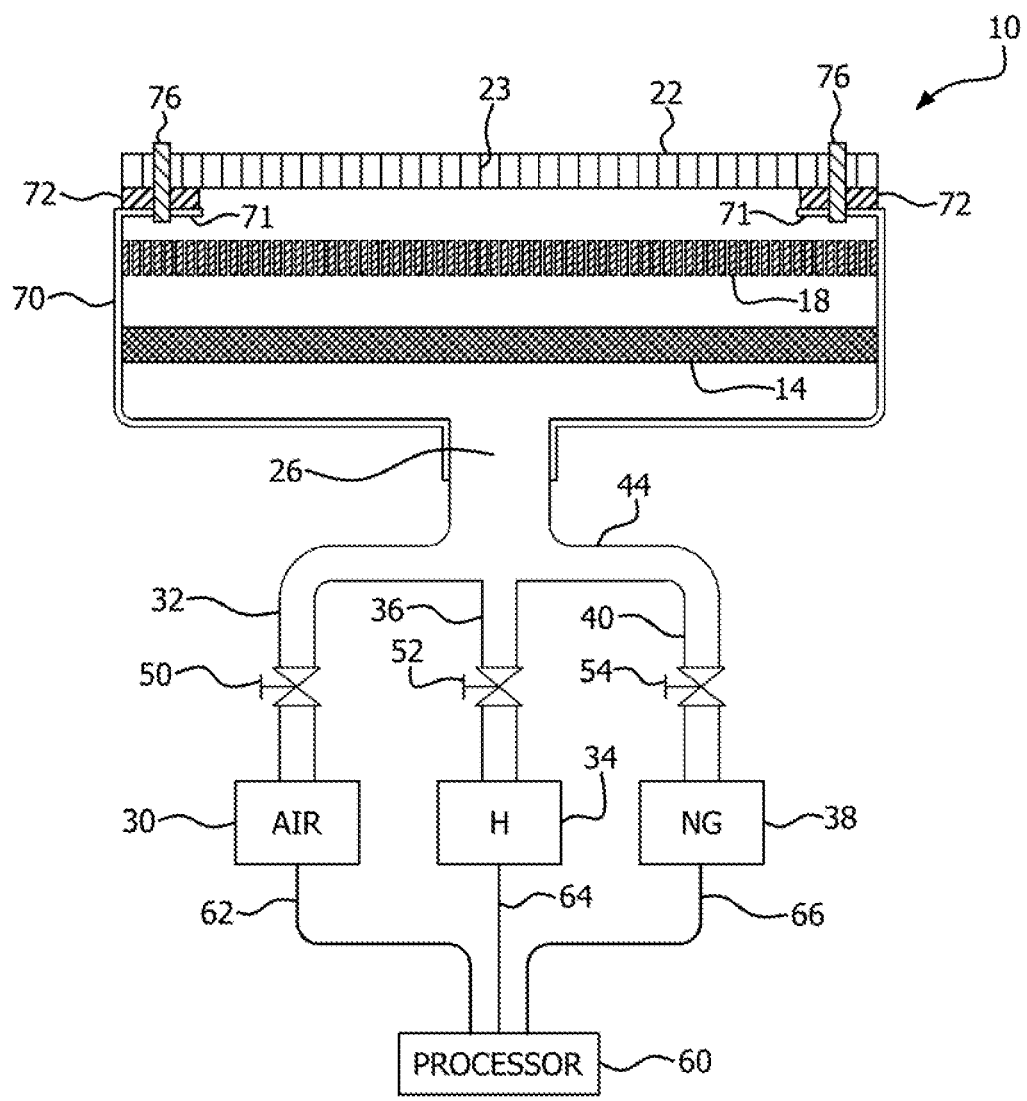
FIG. 1 is a schematic cross section of a heating system according to the invention.

A burner includes a primary input port configured to receive hydrogen-containing fuel and primary oxygen-containing gas. The hydrogen-containing fuel comprises $H_2$ and hydrocarbon gas, such that the $H_2$ has a molar concentration of $0<H_2\leq100\%$. A fuel-distribution element is fluidly coupled with the input port. The fuel-distribution element includes a plurality of distribution openings configured to distribute the primary oxygen-containing gas and the hydrogen-containing fuel through the plurality of distribution openings. A flashback arrestor element is disposed downstream from the fuel distribution element. The flashback arrestor element includes a plurality of flashback arrestor element channels configured to guide the primary oxygen-containing gas and hydrogen-containing fuel from the fuel-distribution element through the burner. A mean width of the flashback arrestor element channels is smaller than a critical flame quench diameter of the hydrogen-containing fuel. A combustion element is disposed downstream from the flashback arrestor element and arranged to form an interface of the burner with ambient air. The combustion element includes a plurality of combustion element apertures configured to output the primary oxygen-containing gas and the hydrogen-based fuel from inside to outside of the burner, to cause the burner to produce a flame and/or infrared heat. A mean width of the combustion element apertures can be 2-4 times larger than the mean width of the flashback arrestor element channels.

The oxygen-containing gas can be selected from different gas sources. The oxygen-containing gas can be air. The flow rate of the oxygen-containing gas relative to the flow rate of the hydrogen-containing fuel can vary depending on the application characteristics. The burner can work as both atmospheric and force air design. The primary oxygen-containing gas can be drawn from ambient atmosphere via a venturi or other structure, or the air can be supplied from a source such as air blower.

The hydrogen-containing fuel can comprise pure $H_2$ and mixtures of $H_2$ with another hydrocarbon fuel. Different hydrocarbon fuels are possible. The hydrocarbon fuel can comprise at least one selected from the group consisting of natural gas, methane, propane, butane and biogas.

The burner can further include a burner housing. The primary air input port, the fuel distribution element, the flashback arrestor element, and the combustion element can be disposed in the burner housing. The burner housing can include at least one selected from the group consisting of metal and plastic. Given the hydrogen embrittlement risk associated with metals, high temperature and low thermal conductivity plastics such as polyetherimide, polyether ether ketone, polyamide and the like are ideal choices if the thermal energy is released away from the structure and no significant heat transfer occurs between the hot surface and the structure. Experimental results have shown that the housing underneath the hot surface remains cold (below 80 degrees Celsius) during combustion.

The thermal isolation provided by the invention particularly allows for the use of plastic materials where previously metals were required. The burner housing can be manufactured from plastic with an upper working temperature in the range of 180-360° C. and thermal conductivity in the range of 0.1-0.5 W/mK.

The flashback arrestor element can comprise a material with a thermal conductivity of from 1.5 to 10 W/mK. The flashback arrestor element can be comprised of ceramic materials or plastic materials. The ceramic materials can include at least one selected from the group consisting of cordierite, mullite, alumina, zirconia, and silica-alumina.

The burner housing, the fuel distribution element, and the flashback arrestor element can all or separately be made of plastics. These components can be made via 3D printing. The entire structure except the combustion element can be manufactured in one manufacturing step such as a 3D printing process which will produce a monolithic structure. The plastic materials can include at least one selected from the group consisting of polyetherimide, polyether ether ketone, polyamide, polyimide, fluorinated ethylene propylene copolymer, polybenzimidazole, glass fiber reinforced polyphenylenesulfide, and polytetrafluoroethylene. Other plastics are possible.

A mean width of the flashback arrestor element channels is smaller than a critical flame quench diameter of the hydrogen-containing fuel. The critical flame quench diameter of the hydrogen-containing fuel can be defined as the critical distance below which flame cannot propagate. The flashback arrestor element channels can have a mean width of 200-600 µm. The mean width of the flashback arrestor element channels can be from 200 to 1000 µm. The mean width of the flashback arrestor channels can be 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, or 1000 µm, and can be within a range of any high value and low value selected from these values. The length of the flashback arrestor element channels can be from 0.25 to 0.5 inches. The length of the flashback arrestor channels can be 0.25, 0.275, 0.30, 0.325, 0.35, 0.375, 0.40, 0.425, 0.45, 0.475, or 0.50 inches, and can be within a range of any high value and low value selected from these values.

The cross-sectional shape of the flashback arrestor channels can be irregular or fixed. The flashback arrestor element channels in cross section can have a shape that is at least one selected from the group consisting of square, circular, pentagonal or triangular. Other shapes are possible.

The cells per square inch (CPSI) for the flashback arrestor element channels can vary. The cells per square inch (CPSI) for the flashback arrestor element channels can be 200-400 CPSI. The CPSI of the flashback arrestor element channels can be 200, 225, 250, 275, 300, 325, 350, 375, or 400 CPSI, and can be within a range of any high value and low value selected from these values.

The combustion element can be made from various materials that are suitable for this purpose. The materials forming the combustion element can include surface metal oxides. The combustion element can include a material having an emissivity that is >0.75. The combustion element can include a material having an emissivity of from 0.75 to 0.92. Suitable materials for forming the combustion element can include of at least one selected from the group consisting of NiCrAl, NiCr, FeCrAl, and FeNi. Other materials are possible.

The combustion element thickness can vary. In one aspect, the thickness of the combustion element can be from 1 mm to 2 mm. The combustion element can include catalytic material to suppress undesired emissions. The catalytic material can include at least one selected from the group consisting of platinum, palladium, rhodium, $Mn_2O_3$, CuO, $Cr_2O_3$, and $Mn_3O_4$.

The fuel-distribution element, the flashback arrestor element, and the combustion element can be arranged in a planar configuration. The fuel-distribution element, the flashback arrestor element, and the combustion element can alternatively be arranged in a concentric configuration. The concentric configuration can be tubular. The burner can have any geometrical shape-circular, square, rectangular, as well as customized shapes.

To further alleviate the heat transfer from the hot surface to the plastic housing underneath, the combustion element can be thermally isolated using conventional insulation materials. Insulating materials such as polycrystalline high alumina wool, fiberglass fiber, ceramic fiber rated for temperatures>1000° C. and thermal conductivity of 0.1-0.25 W/m K can be used. Other insulating materials are possible.

The channels can have different longitudinal shapes. At least one of the fuel distribution element channels, the flashback arrestor channels, and the combustion element channels, can have straight channels. Tortuous channels, curved channels, angled channels and mesh channels are also possible.

The burner can include a secondary flashback arrestor element disposed inside the burner downstream from the flashback arrestor element and upstream from the combustion element. A secondary oxygen-containing gas input port can be configured to receive secondary oxygen-containing gas between the combustion element and the secondary flashback arrestor element. The secondary flashback arrestor element can include a plurality of secondary flashback arrestor element channels configured to guide the primary oxygen-containing gas, and the hydrogen-based fuel from the flashback arrestor element through the burner. A mean width of the secondary flashback arrestor element's channels can be 1.5-2 times larger than the mean width of the flashback arrestor element channels. The secondary flashback arrestor element can be made from materials that are the same or different from the materials making up the primary flashback arrestor element, such as but not limited to ceramic and plastic materials. The CPSI of the secondary flashback arrestor element channels can be between 100-300 CPSI. The thickness of the secondary flashback arrestor element can be from 0.25 and 0.5 inches.

The distance between the combustion element and the flashback arrestor element can be from 0.5 to 1 inches. The distance between the flashback arrestor element and the secondary flashback arrestor element can be from 0.25 to 0.5 inches. Other distances are possible.

The combustion element can include an electrically conductive material. Electrical contacts can be electrically connected to the combustion element. An electrical power circuit can be connected to the electrical contacts. An electrical power source can provide power to the electrical power circuit. A processor can be provided for controlling the flow of power through the electrical power circuit. The burner in this embodiment has the ability to operate in following heat-generating modes: (1) gas combustion heating only (2) electric resistance heating only, and (3) gas combustion and electric resistance heating simultaneously. The processor can be capable of modulating the electric and gas supply rates to utilize the available primary energy for achieving the lowest carbon emissions and lowest operating costs along with improving the resiliency.

The burner of the invention can be used to replace burners in a variety of different devices. The burner can be attached to at least one selected from the group consisting of stoves, hot water tanks, furnaces, ovens, boilers, industrial heating systems, and industrial drying systems. Other devices are possible.

A method of heating can include the step of providing a burner comprising a primary input port, a fuel distribution element, a flashback arrestor element, and a combustion element. The primary input port is configured to receive hydrogen-containing fuel and primary oxygen-containing gas, wherein the hydrogen-containing fuel comprises $H_2$ and hydrocarbon gas, such that the $H_2$ has a molar concentration of $0<H_2\leq100\%$. The fuel-distribution element is fluidly coupled with the input port, wherein the fuel-distribution element comprises a plurality of distribution openings configured to distribute the primary oxygen-containing gas and the hydrogen-containing fuel through the plurality of distribution openings. The flashback arrestor element is disposed downstream from the fuel distribution element, wherein the flashback arrestor element comprises a plurality of flashback arrestor element channels configured to guide the primary oxygen-containing gas and hydrogen-containing fuel from the fuel-distribution element through the burner, wherein a mean width of the flashback arrestor element channels is smaller than a critical flame quench diameter of the hydrogen-containing fuel. The combustion element is disposed downstream from the flashback arrestor element and arranged to form an interface of the burner with ambient air, wherein the combustion element comprises a plurality of combustion element apertures configured to output the primary air and the hydrogen-based fuel from inside to outside of the burner, to cause the burner to produce a flame and/or infrared heat, wherein a mean width of the combustion element apertures is 2-4 times larger than the mean width of the flashback arrestor element channels.

Primary oxygen-containing gas and a hydrogen-containing fuel comprising $H_2$ and a hydrocarbon gas are directed to the primary input port through atmospheric air entrainment or forced air supply. The primary oxygen-containing gas and the hydrogen-containing fuel are combusted to generate heat at the combustion element.

A heating system comprises a burner comprising a primary input port, a fuel distribution element, a flashback arrestor element, and a combustion element. The primary input port is configured to receive hydrogen-containing fuel and primary oxygen-containing gas, wherein the hydrogen-containing fuel comprises $H_2$ and hydrocarbon gas, such that the $H_2$ has a molar concentration of $0<H_2 \leq 100\%$. The fuel-distribution element is fluidly coupled with the input port, wherein the fuel-distribution element comprises a plurality of distribution openings configured to distribute the primary oxygen-containing gas and the hydrogen-containing fuel through the plurality of distribution openings. The flashback arrestor element is disposed downstream from the fuel distribution element, wherein the flashback arrestor element comprises a plurality of flashback arrestor element channels configured to guide the primary oxygen-containing gas and hydrogen-containing fuel from the fuel-distribution element through the burner, wherein a mean width of the flashback arrestor element channels is smaller than a critical flame quench diameter of the hydrogen-containing fuel. The combustion element is disposed downstream from the flashback arrestor element and arranged to form an interface of the burner with ambient air, wherein the combustion element comprises a plurality of combustion element apertures configured to output the primary air and the hydrogen-based fuel from inside to outside of the burner, to cause the burner to produce a flame and/or infrared heat, wherein a mean width of the combustion element apertures is 2-4 times larger than the mean width of the flashback arrestor element channels. A source of the hydrogen-containing fuel is connected to the input port.

There is shown in FIG. 1 a burner 10 according to the invention. The burner 10 includes a fuel distribution element 14, a flashback arrestor element 18, and a combustion element 22 with straight channels 23. A primary input port 26 is configured to receive hydrogen-containing fuel and primary oxygen-containing gas. The primary input port 26 receives hydrogen-containing fuel and primary oxygen-containing gas from an oxygen-containing gas source 30 which can be air, a hydrogen gas source 34, and a natural gas source 38. The primary oxygen-containing gas source 30 can communicate with an input conduit 32 which can be controlled by a primary oxygen-containing gas flow control valve 50. The hydrogen gas source 34 can communicate with an input conduit 36 and can be controlled by a hydrogen gas flow control valve 52. The natural gas source 38 can communicate with an input conduit 40 and can be controlled by a natural gas flow control valve 54. The oxygen-containing gas input conduit 32, hydrogen gas input conduit 36, and natural gas input conduit 40 can communicate with a manifold 44 which is fluidly connected to the primary input port 26. Each of the primary oxygen-containing gas source 30 and/or the primary oxygen-containing gas flow control valve 50, the hydrogen gas source 34 and/or the hydrogen gas flow control valve 52, and the natural gas source 38 and/or the natural gas flow control valve 54 can be controlled by a processor 60 through respective control lines 62, 64 and 66. The fuel distribution element 14, a flashback arrestor element 18, and a combustion element 22 can be positioned within a housing 70 which confines the gases within and requires flow through the respective channels.

Figure 2:
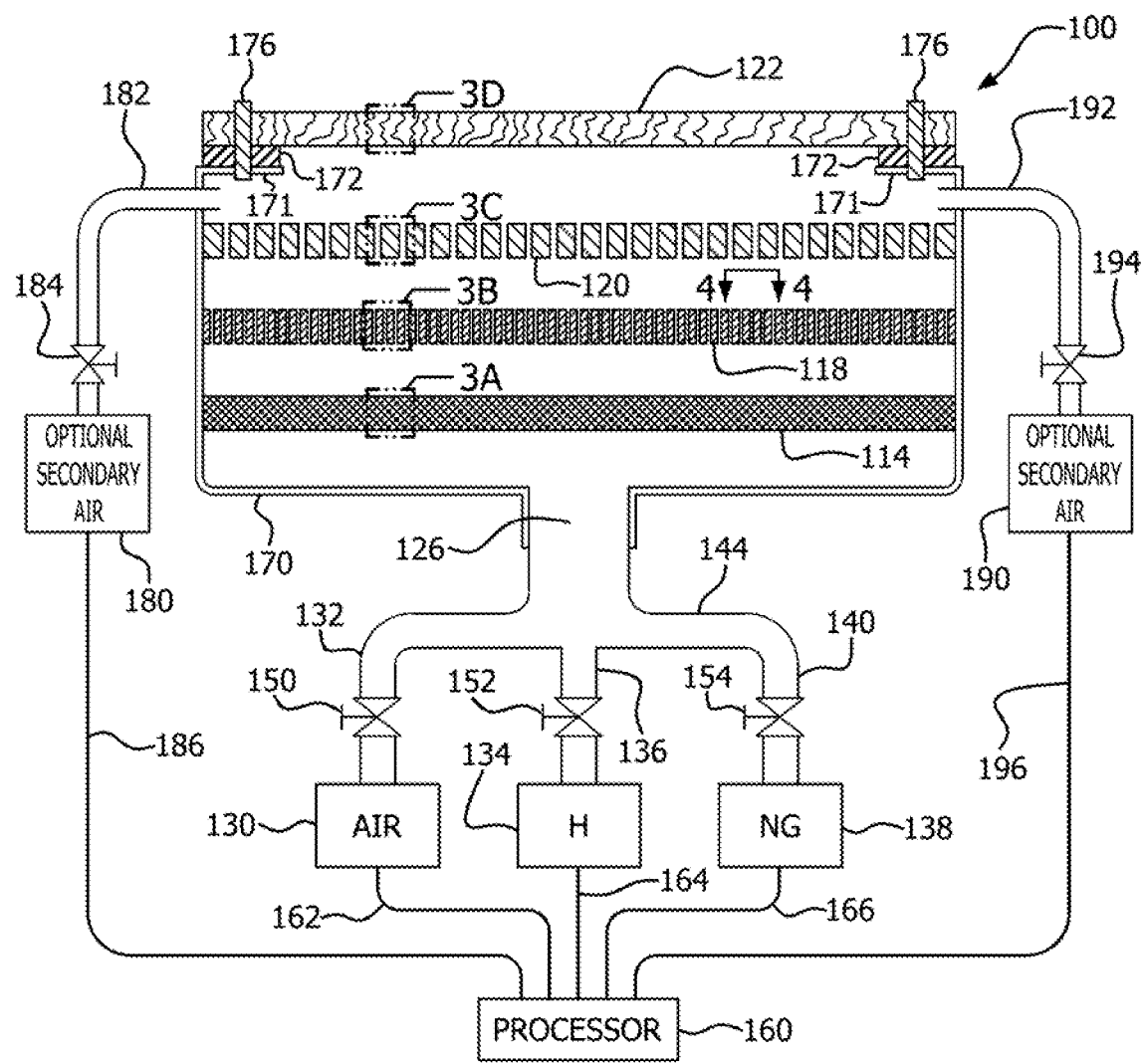
FIG. 2 is a schematic cross section of an alternative embodiment including a secondary flashback arrestor element and a secondary oxygen-containing gas input port.

There is shown in FIG. 2 a burner 100 according to an alternative embodiment of the invention. The burner 100 includes a fuel distribution element 114, a flashback arrestor element 118, a secondary flashback arrestor element 120, and a combustion element 122. A primary input port 126 is configured to receive hydrogen-containing fuel and primary oxygen-containing gas. The primary input port 126 receives hydrogen-containing fuel and primary oxygen-containing gas from an oxygen-containing gas source 130, a hydrogen gas source 134, and a natural gas source 138. The primary oxygen-containing gas source 130 can communicate with an input conduit 132 which can be controlled by a primary oxygen-containing gas flow control valve 150. The hydrogen gas source 134 can communicate with an input conduit 136 and can be controlled by a hydrogen gas flow control valve 152. The natural gas source 138 can communicate with an input conduit 140 and can be controlled by a natural gas flow control valve 154. The oxygen-containing gas input conduit 132, hydrogen gas input conduit 136, and natural gas input conduit 140 can communicate with a manifold 144 which is fluidly connected to the primary input port 126. Each of the primary oxygen-containing gas source 130 and/or the primary oxygen-containing gas flow control valve 150, the hydrogen gas source 134 and/or the hydrogen gas flow control valve 152, and the natural gas source 138 and/or the natural gas flow control valve 154 can be controlled by a processor 160 through respective control lines 162, 164 and 166. A housing 170 for the burner 100 can also be provided.

One or more secondary oxygen-containing gas sources 180 and 190 can be provided. The secondary oxygen-containing gas source 180 can communicate with a secondary oxygen-containing gas input port 182 and can be controlled by secondary oxygen-containing gas flow control valve 184 and control line 186 communicating with processor 160. The secondary oxygen-containing gas source 190 can communicate with a secondary oxygen-containing gas input port 192 and can be controlled by secondary oxygen-containing gas flow control valve 194 and control line 196 communicating with processor 160. The secondary oxygen-containing gas input ports 182 and 192 direct oxygen-containing gas to the space between the secondary flashback arrestor element 120 and the combustion element 122.

Figure 3A:
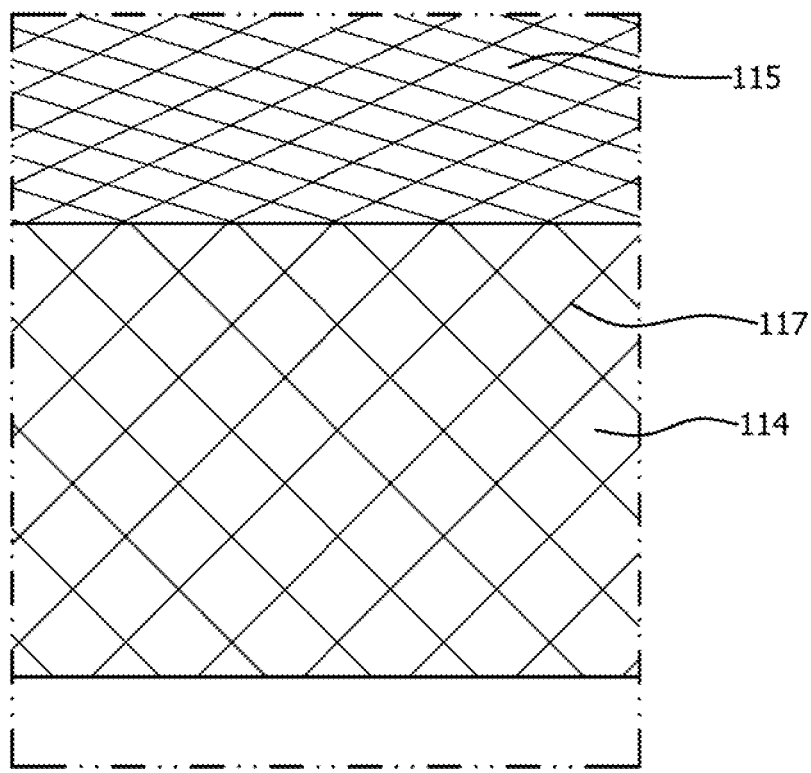
FIG. 3A is an expanded view of area 3A in FIG. 2.
Figure 3B:
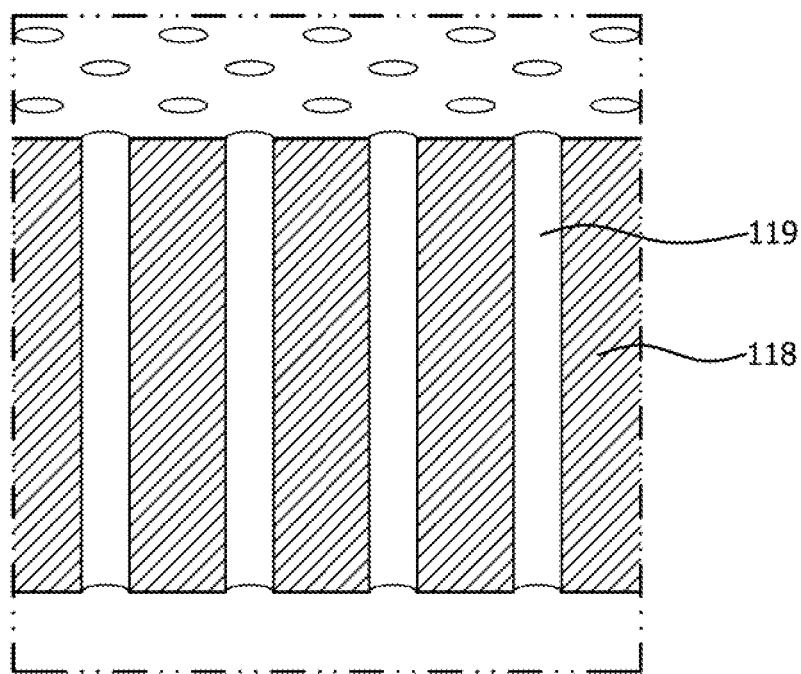
FIG. 3B is an expanded view of area 3B in FIG. 2.
Figure 3C:
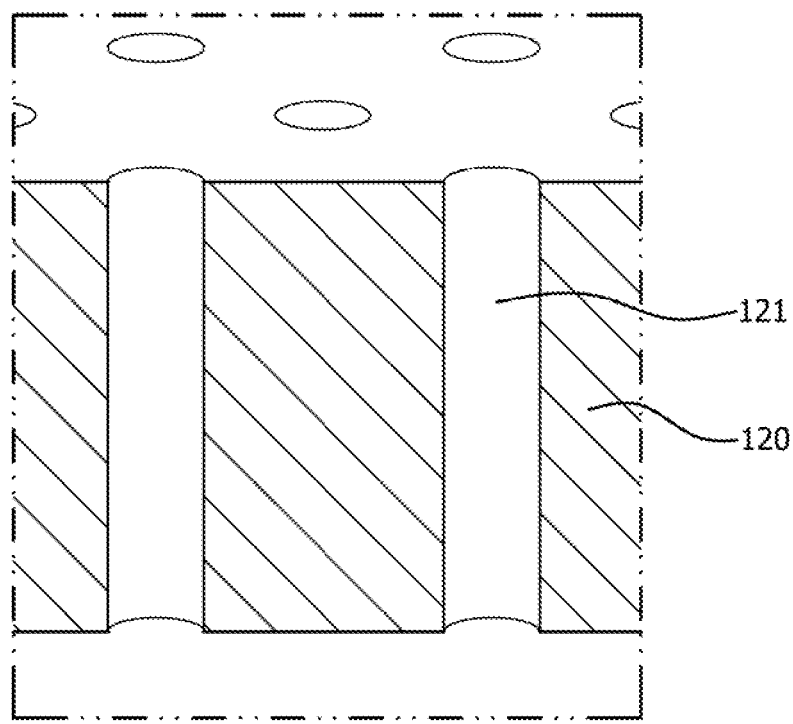
FIG. 3C is an expanded view of area 3C in FIG. 2.
Figure 3D:
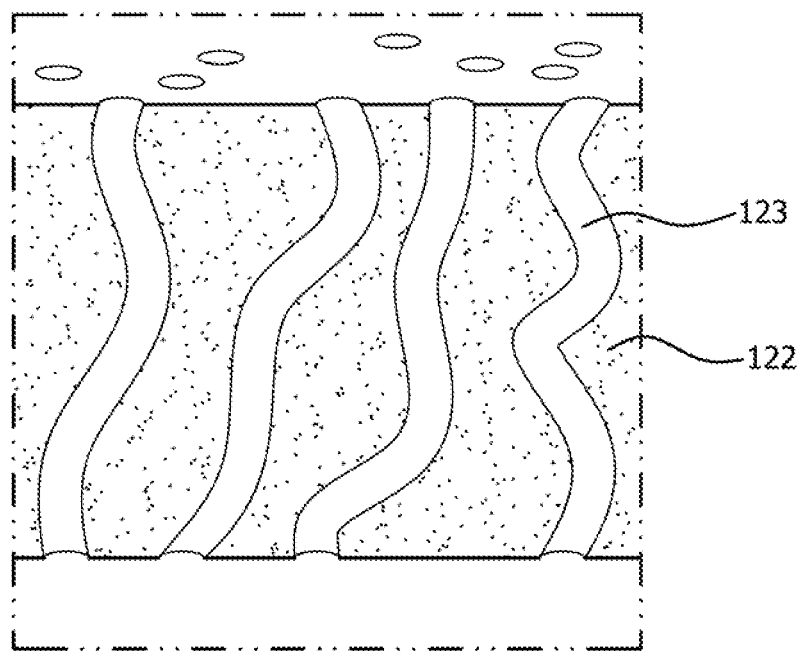
FIG. 3D is and expanded view of area 3D in FIG. 2.

FIG. 3A is an expanded view of area 3A of the distribution element 114 shown in FIG. 2, including channels 115 and mesh 117. FIG. 3B is an expanded view of area 3B of the flashback arrestor element 118 shown in FIG. 2 including channels 119. FIG. 3C is an expanded view of area 3C of the secondary flashback arrestor element 120 shown in FIG. 2, including channels 121. FIG. 3D is an expanded view of area 3D of the combustion element 122 shown in FIG. 2 including tortuous channels 123, unlike the combustion element 22 of FIG. 1 which has straight channels 23.

Figure 4A:
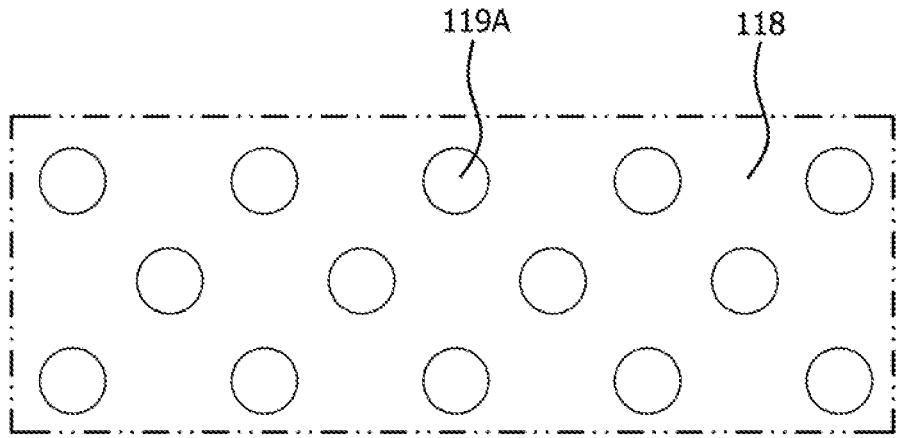
FIG. 4A is a plan view of flashback arrestor channels that are circular in cross section.
Figure 4B:
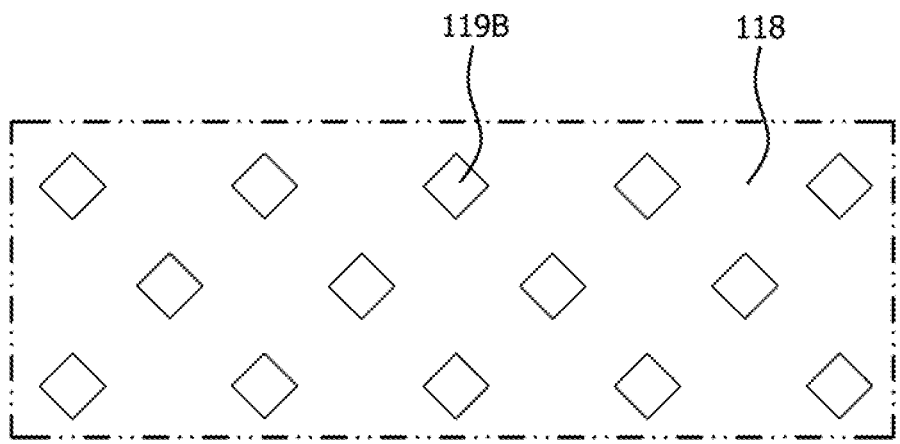
FIG. 4B is a plan view of flashback arrestor channels that are diamond-shaped in cross section.
Figure 4C:
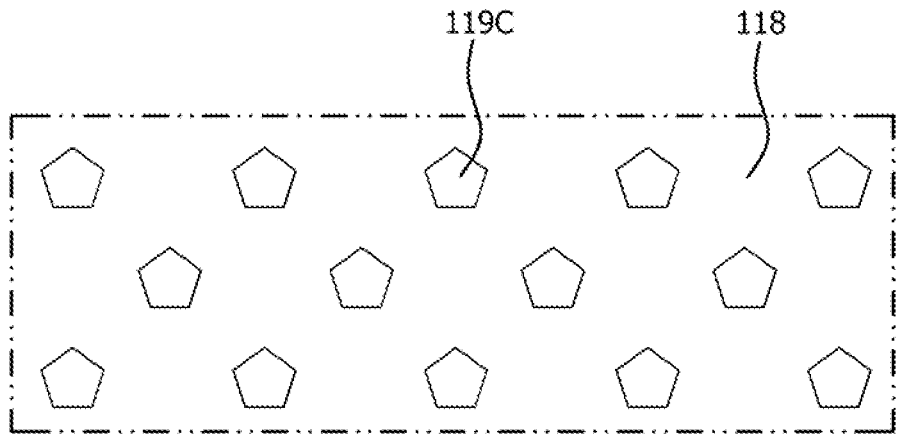
FIG. 4C is a plan view of flashback arrestor channels that are pentagonal in cross section.
Figure 4D:
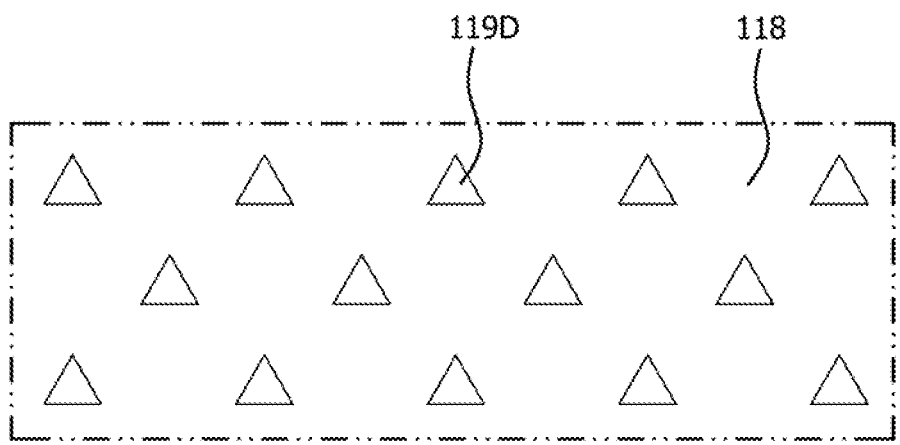
FIG. 4D is a plan view of flashback arrestor channels that are triangular in cross section.

FIG. 4A is a plan view of flashback arrestor channels 119A of the flashback arrestor element 118 that are circular in cross section. FIG. 4B is a plan view of flashback arrestor channels 119B of the flashback arrestor element 118 that are diamond-shaped in cross section. FIG. 4C is a plan view of flashback arrestor channels 119C of the flashback arrestor element 118 that are pentagonal in cross section. FIG. 4D is a plan view of flashback arrestor channels 119D of the flashback arrestor element 118 that are triangular in cross section.

Figure 5:
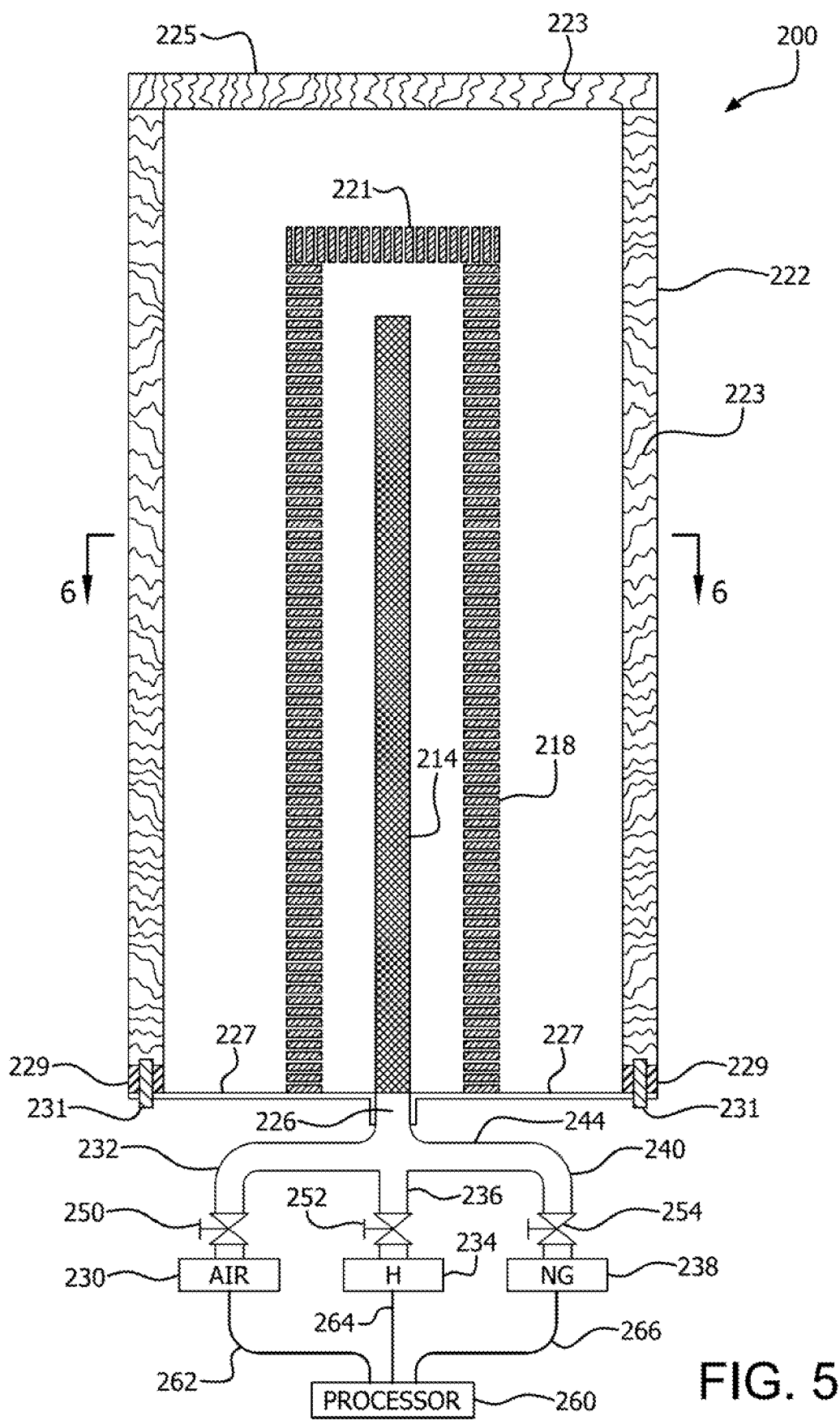
FIG. 5 is a schematic cross section of a heating system in a concentric configuration.
Figure 6:
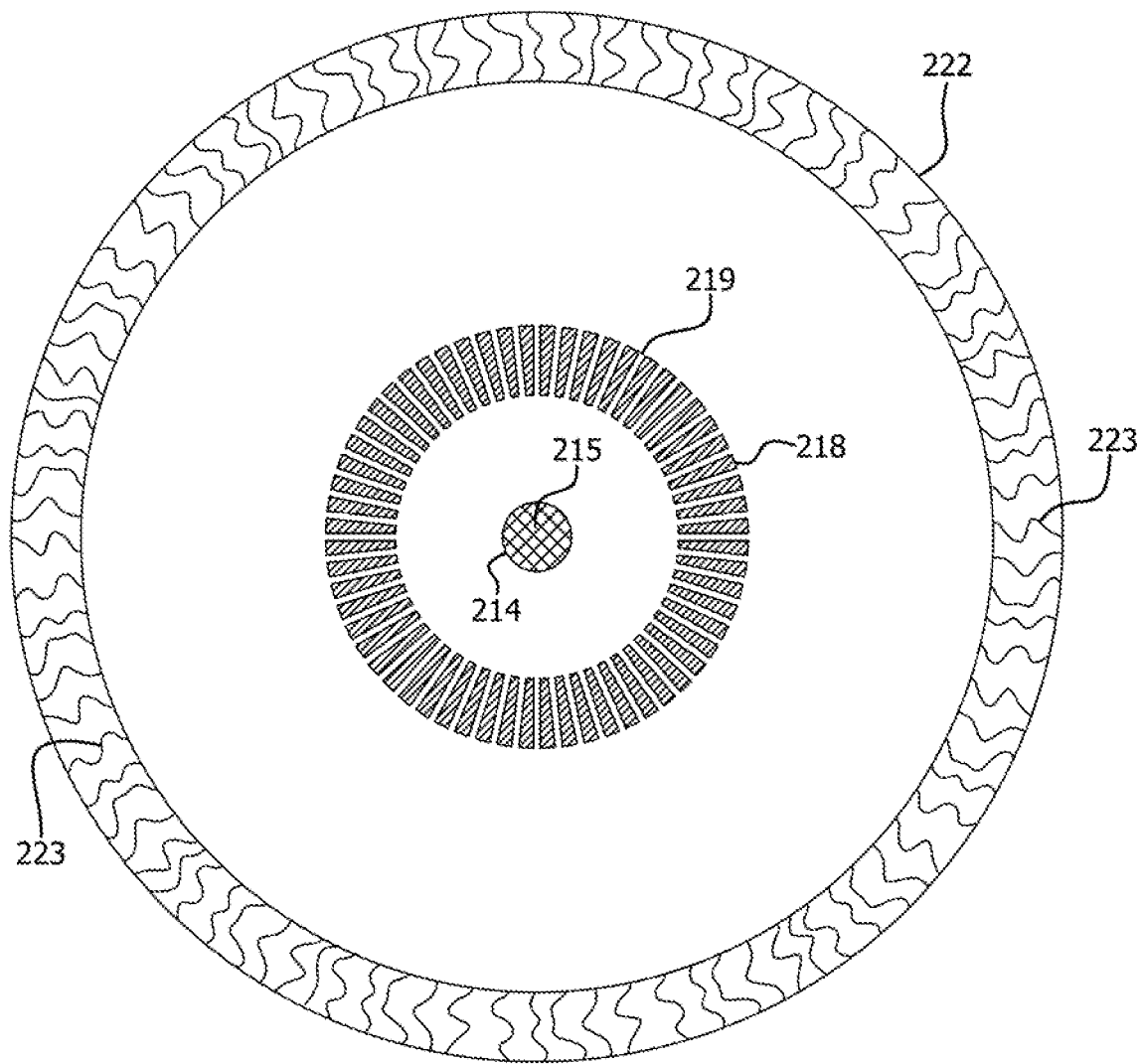
FIG. 6 is a cross section taken along line 6-6 in FIG. 5.

There shown in FIGS. 5-6 a burner 200 with a concentric configuration. The burner 200 includes a distribution element 214 with channels 215 and a cylindrical flashback arrestor element 218 with channels 219. The flashback arrestor element 218 is surrounded by a combustion element 222 with channels 223. The flashback arrestor element 218 can be concentric with the distribution element 214, and can be generally tubular in shape with an end cap 221. The combustion element 222 can be concentric with the flashback arrestor element 218, and can be generally tubular in shape with an end cap 225. A primary input port 226 is configured to receive hydrogen-containing fuel and primary oxygen-containing gas. The primary input port 226 receives hydrogen-containing fuel and primary oxygen-containing gas from an oxygen-containing gas source 230, a hydrogen gas source 234, and a natural gas source 238. The primary oxygen-containing gas source 230 can communicate with an input conduit 232 which can be controlled by a primary oxygen-containing gas flow control valve 250. The hydrogen gas source 234 can communicate with an input conduit 236 and can be controlled by a hydrogen gas flow control valve 252. The natural gas source 238 can communicate with an input conduit 240 and can be controlled by a natural gas flow control valve 254. The oxygen-containing gas input conduit 232, hydrogen gas input conduit 236, and natural gas input conduit 240 can communicate with a manifold 244 which is fluidly connected to the primary input port 226. Each of the primary oxygen-containing gas source 230 and/or the primary oxygen-containing gas flow control valve 250, the hydrogen gas source 234 and/or the hydrogen gas flow control valve 252, and the natural gas source 238 and/or the natural gas flow control valve 254 can be controlled by a processor 260 through respective control lines 262, 264 and 266. FIG. 6 is a cross section taken along line 6-6 in FIG. 5 and illustrates channels 215 in the distribution element 214, channels 219 in the flashback arrestor element 218, and channels 223 in the combustion element 222.

Figure 7:
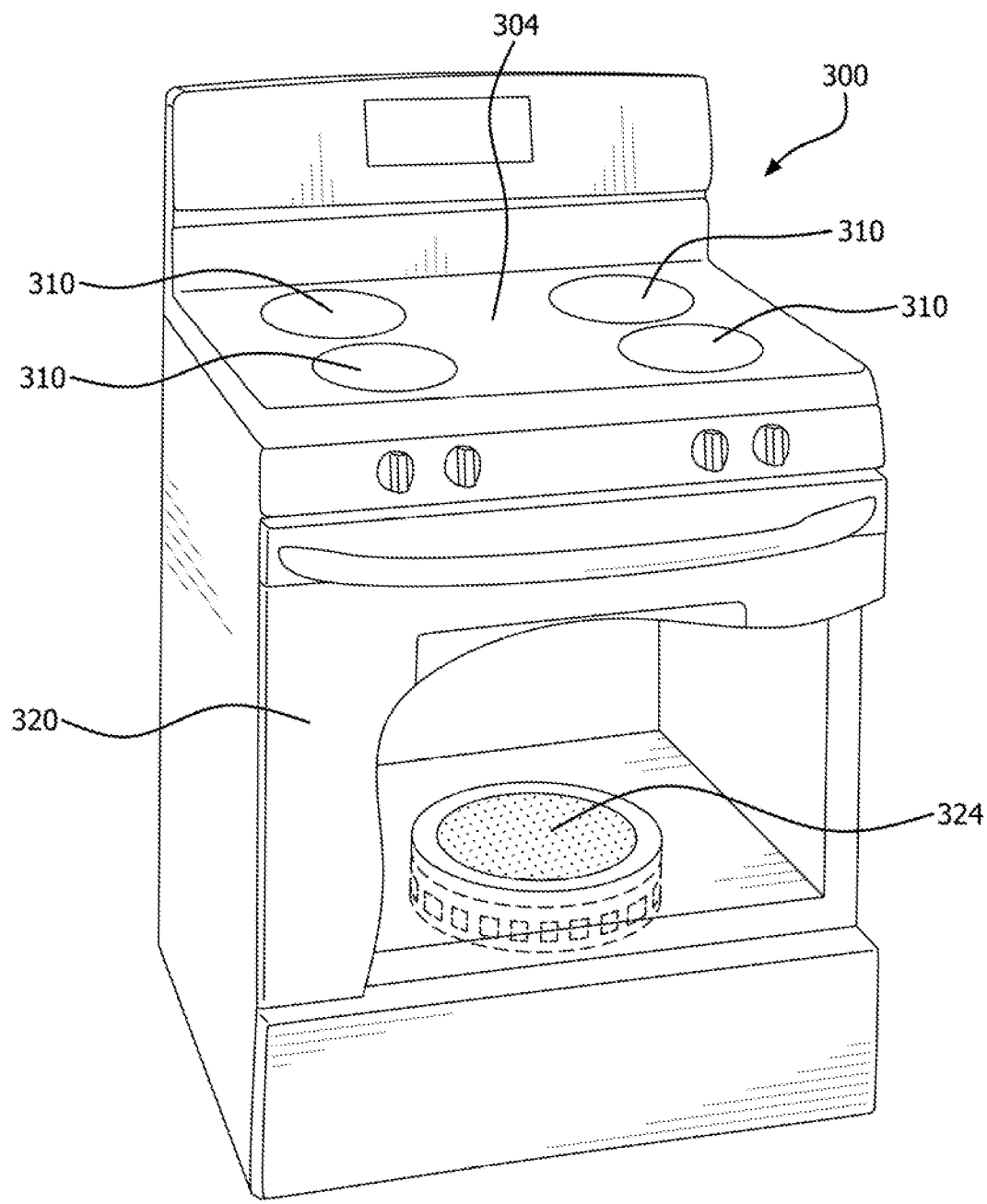
FIG. 7 is a perspective view of a cooktop and oven with burners according to the invention, partially broken away.

FIG. 7 is a perspective view of a range 300 including cooktop 304 with burners 310 according to the invention, and an oven 320 with an oven burner 324 according to the invention. The applicability of the invention was investigated by integrating the burners 310 in a similar cooktop utilizing hydrogen blended with pipeline natural gas compositions and air as an oxygen containing gas. The burner module was integrated with ignition and flame sensors for a safe and reliable operation.

Figure 8:
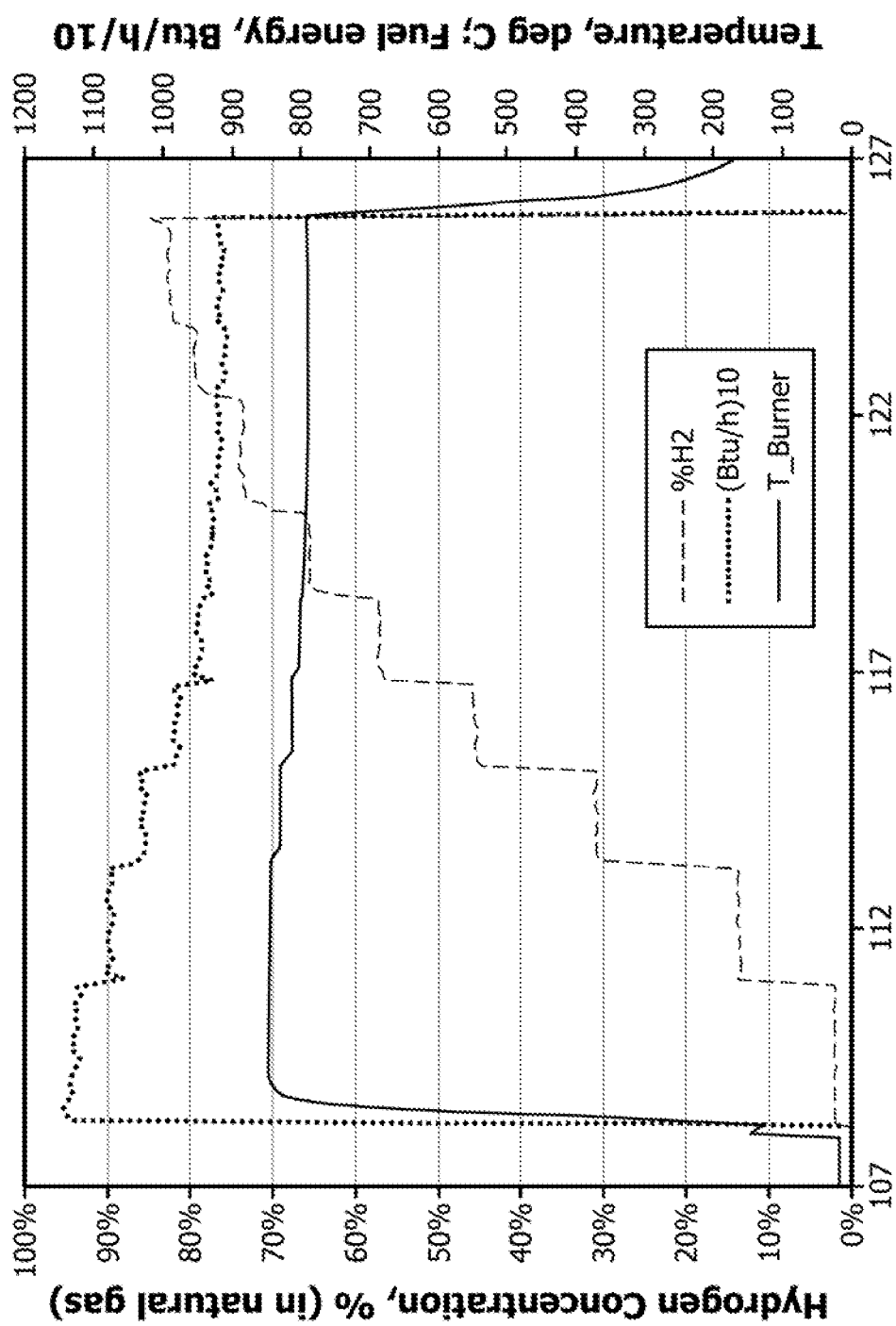
FIG. 8 is a plot of natural gas blended with hydrogen fuel at a wide range of concentrations, burner temperature (deg. C) and fuel energy (Btu/h/10), vs. time (min).

The results of this testing established the safety and fuel flexibility, $NO_x$ pollutant reduction capability, and higher energy efficiency as highly desirable for many thermal needs in the home, in industry, and in buildings. The experimental results shown in FIG. 8 illustrate the promise of the invention in accepting natural gas blended with hydrogen fuel at wide range of concentrations while simultaneously lowering $NO_x$ emissions at power densities approaching 3,000 Btu/h/in$^2$. The burner was evaluated for its performance at different hydrogen concentrations by slowly increasing the hydrogen flow rate after achieving steady state at each test point. As shown in FIG. 8, the minimum Btu rating of the burner was preserved at a value of >9,000 Btu/h while the hydrogen concentration (molar) in the blend was increased from 0-83% without any modification to the feed supply or the burner as the entire test was conducted in a single test in an atmospheric burner with a fixed orifice. The burner temperature remained above 800° C. throughout the test.

Figure 9:
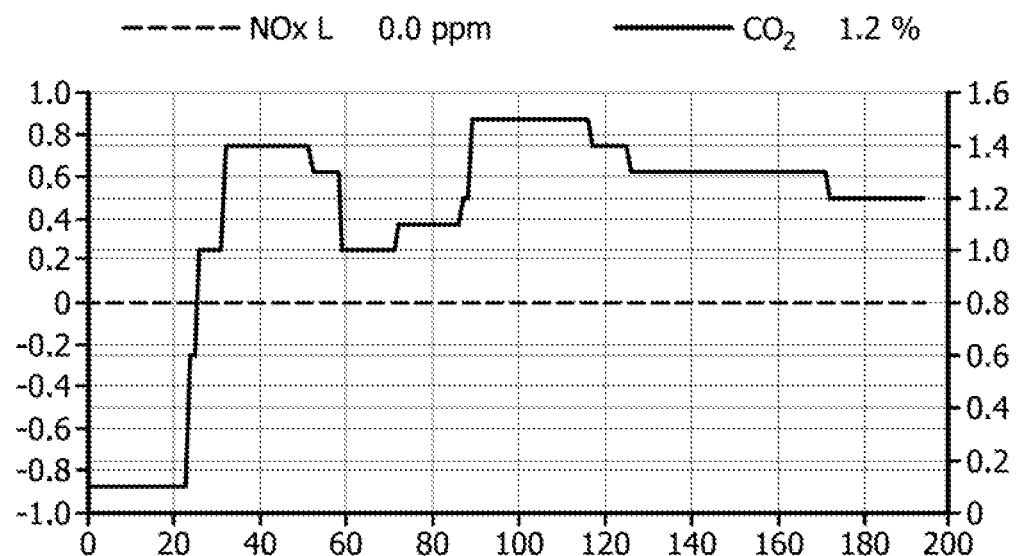
FIG. 9 is a plot of $NO_x$ (ppm) and $CO_2$ (%) emissions vs. time(s) for a burner according to the invention utilizing 75% $H_2$ in natural gas.
Figure 10:
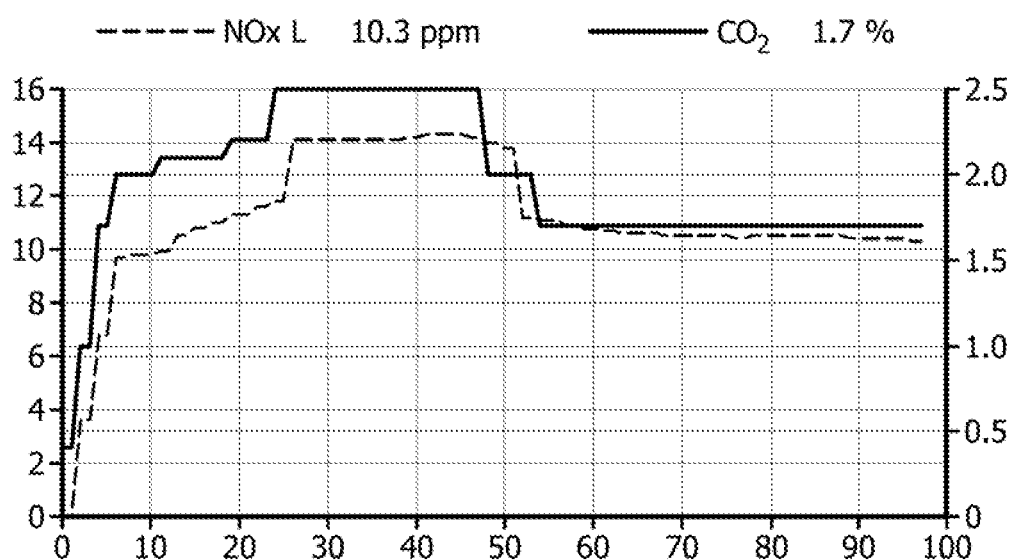
FIG. 10 is a plot of $NO_x$ (ppm) and $CO_2$ (%) emissions vs. time(s) from a conventional burner utilizing 100% natural gas.

$NO_x$ emissions are significantly reduced (measured at <3 ng/J compared to >30 ng/J in conventional burners) since the combustion occurs at a nominal temperature of 900-1,000° C. compared to >1,500° C. in traditional flame-based burners where the propensity for thermally induced $NO_x$ formation is much higher. FIG. 9 is a plot of $NO_x$ (ppm) and $CO_2$ (%) emissions vs. time(s) for a burner according to the invention utilizing 75% $H_2$ in natural gas. FIG. 10 is a plot of $NO_x$ (ppm) and $CO_2$ (%) emissions vs. time(s) from a conventional burner utilizing 100% natural gas. The stabilized surface combustion on the heterogeneous oxide surface eliminates risks associated with corrosion, flame liftoff/blowoff induced by variation in the primary fuel composition supplied (hydrogen blends and methane concentration in biogas). The burner design has been proven to function well under both atmospheric air entrainment (e.g., cooktop) and forced air premixed designs (e.g., furnace).

Figure 11:
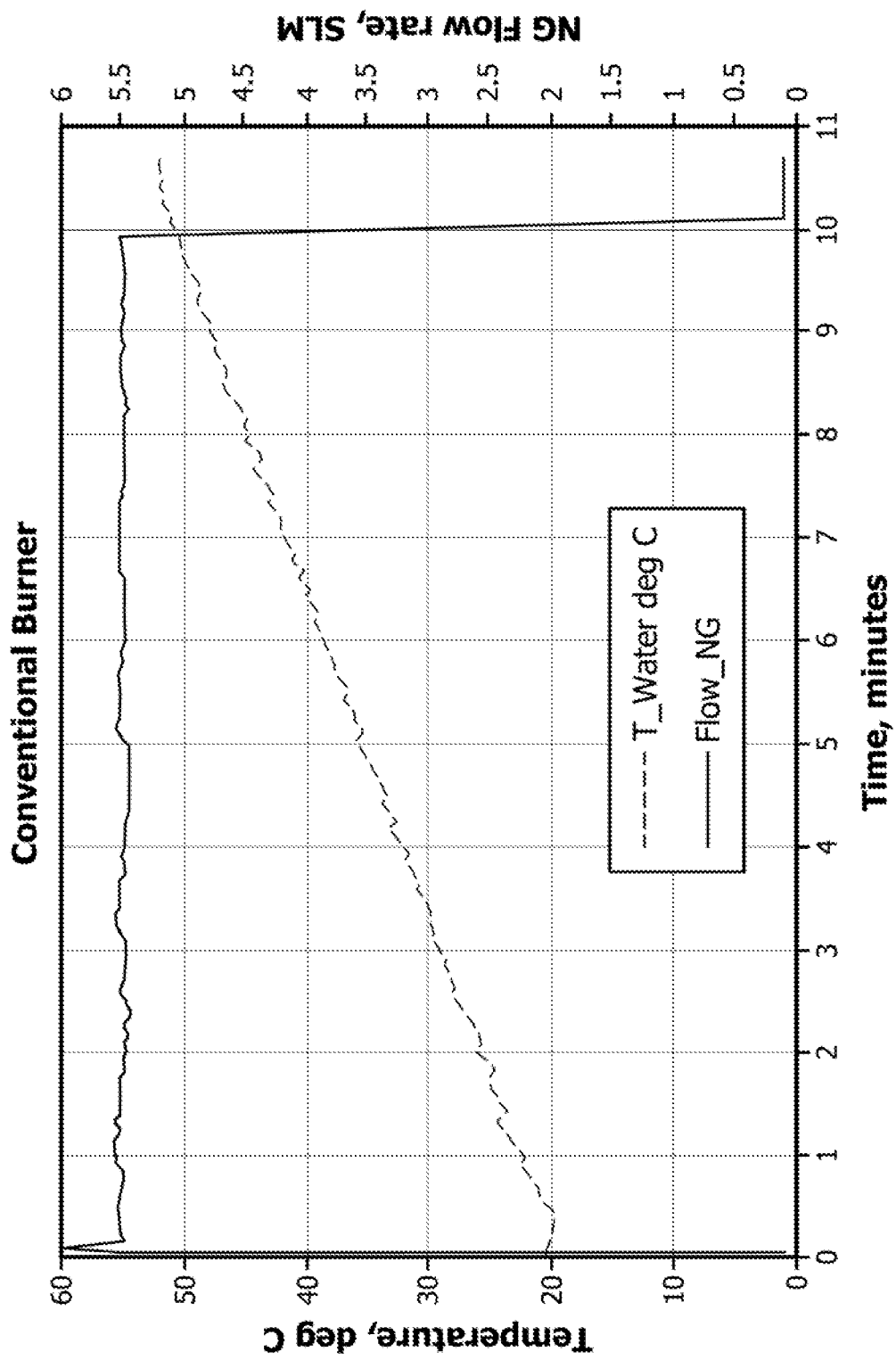
FIG. 11 is a plot of temperature (deg C) and NG flow rate (SLM) vs. time (min) for a conventional NG burner.
Figure 12:
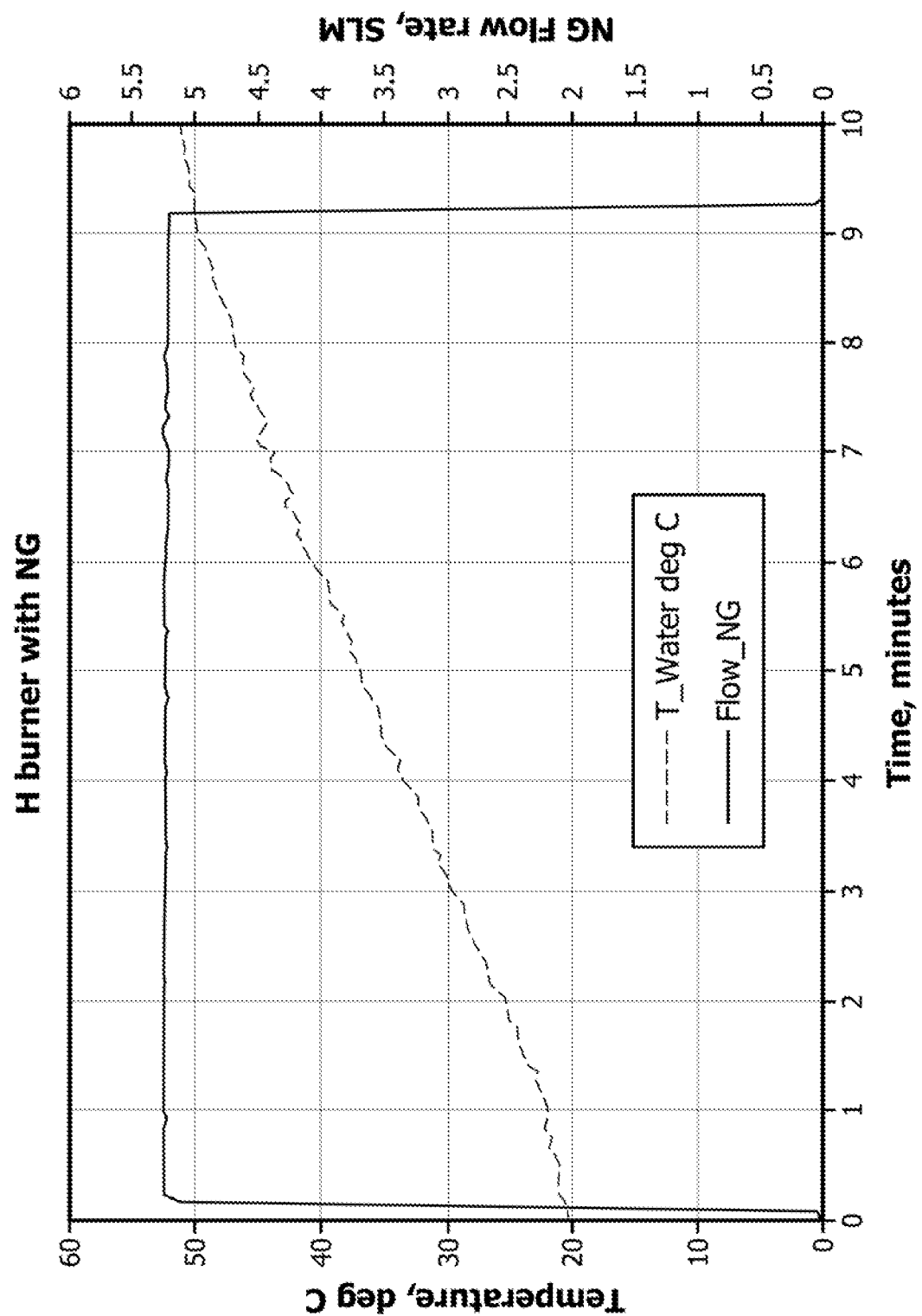
FIG. 12 is a plot of temperature (deg C) and natural gas flow rate (SLM) vs. time (min) for a burner with $H_2$ and natural gas.

Another advantage of the developed burner is its energy utilization efficiency. Compared to the conventional blue flame burner, the infrared burner lowered the total energy consumed by ~15-20% due to efficient heat transfer from the infrared surface via simultaneous radiant and convective heating, as shown in FIGS. 11-12.

Figure 13:
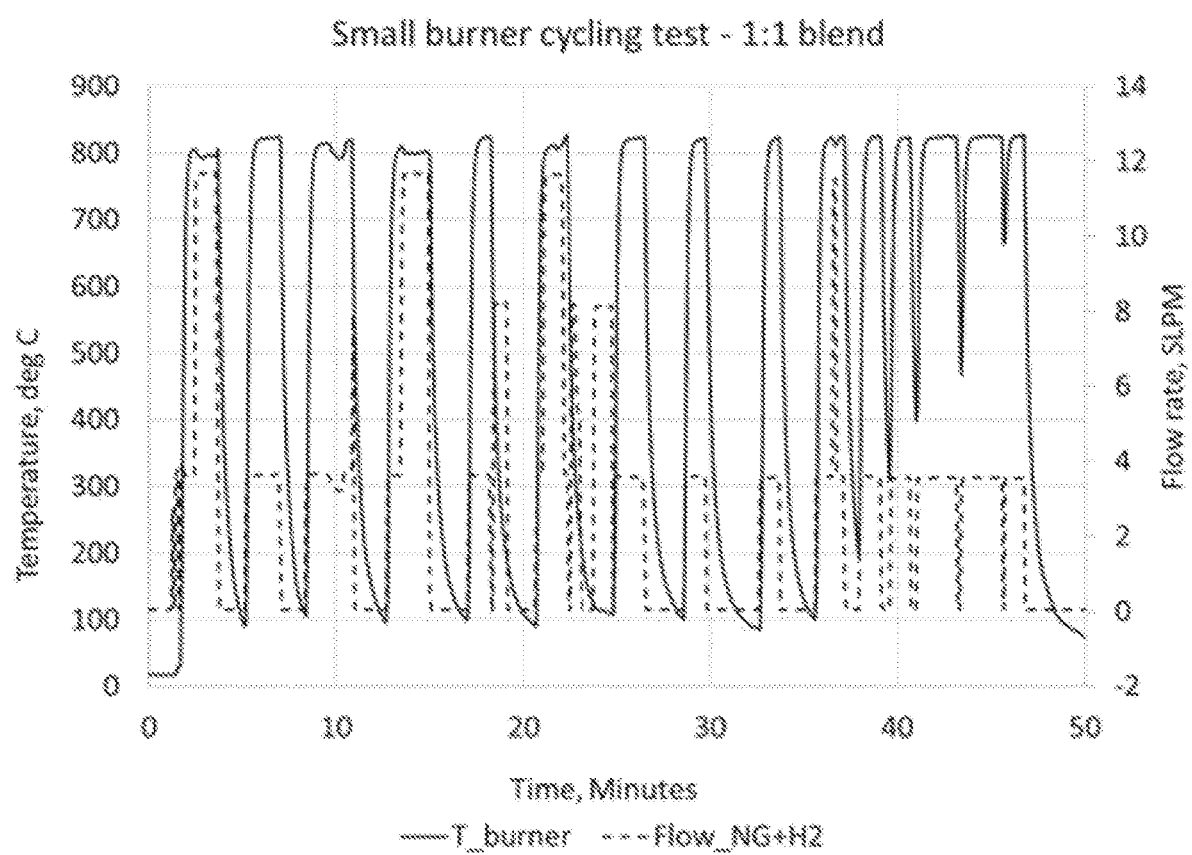
FIG. 13 is a plot of temperature (deg C) and flow rate of natural gas+$H_2$ (SLPM) vs time (min) for a small burner.
Figure 14:
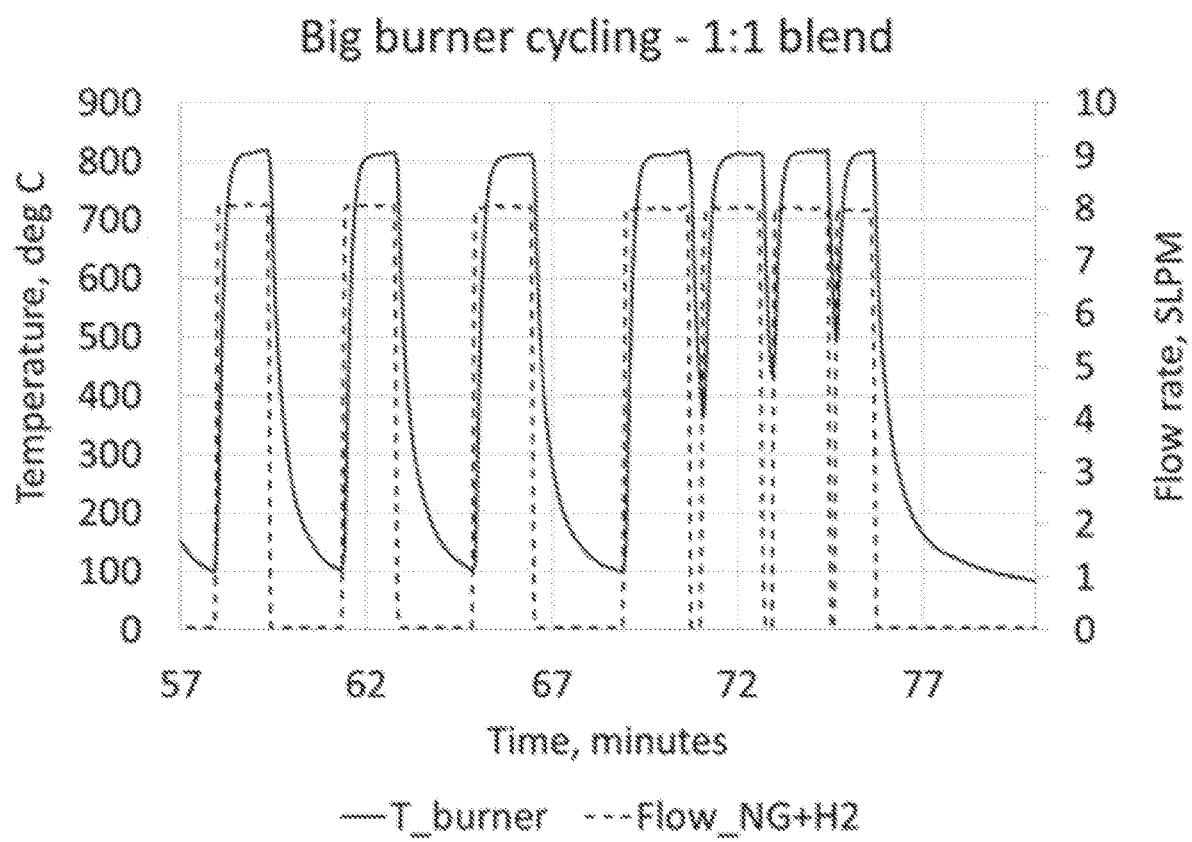
FIG. 14 is a plot of temperature (deg C) and flow rate of natural gas+$H_2$ (SLPM) vs time (min) for a large burner.

Thermal cycling capability and safety of the burners integrated in the cooking range was also tested. FIGS. 13 and 14 show the thermal cycling safety of the two capacity burners supplied with 50% hydrogen blended natural gas. The small burner (5" diameter) was subjected to 15 cycles. The first 10 cycles allowed the hot surface temperature to reach below 100° C. before restarting while the last 5 cycles occurred at higher temperatures in the range of 200-680 C. Similarly, the large burner (11" diameter) was also operated for 7 cycles with first 3 at a lower restart temperature followed by last four at higher restart temperatures, as shown in FIG. 13 and FIG. 14.

Figure 15:
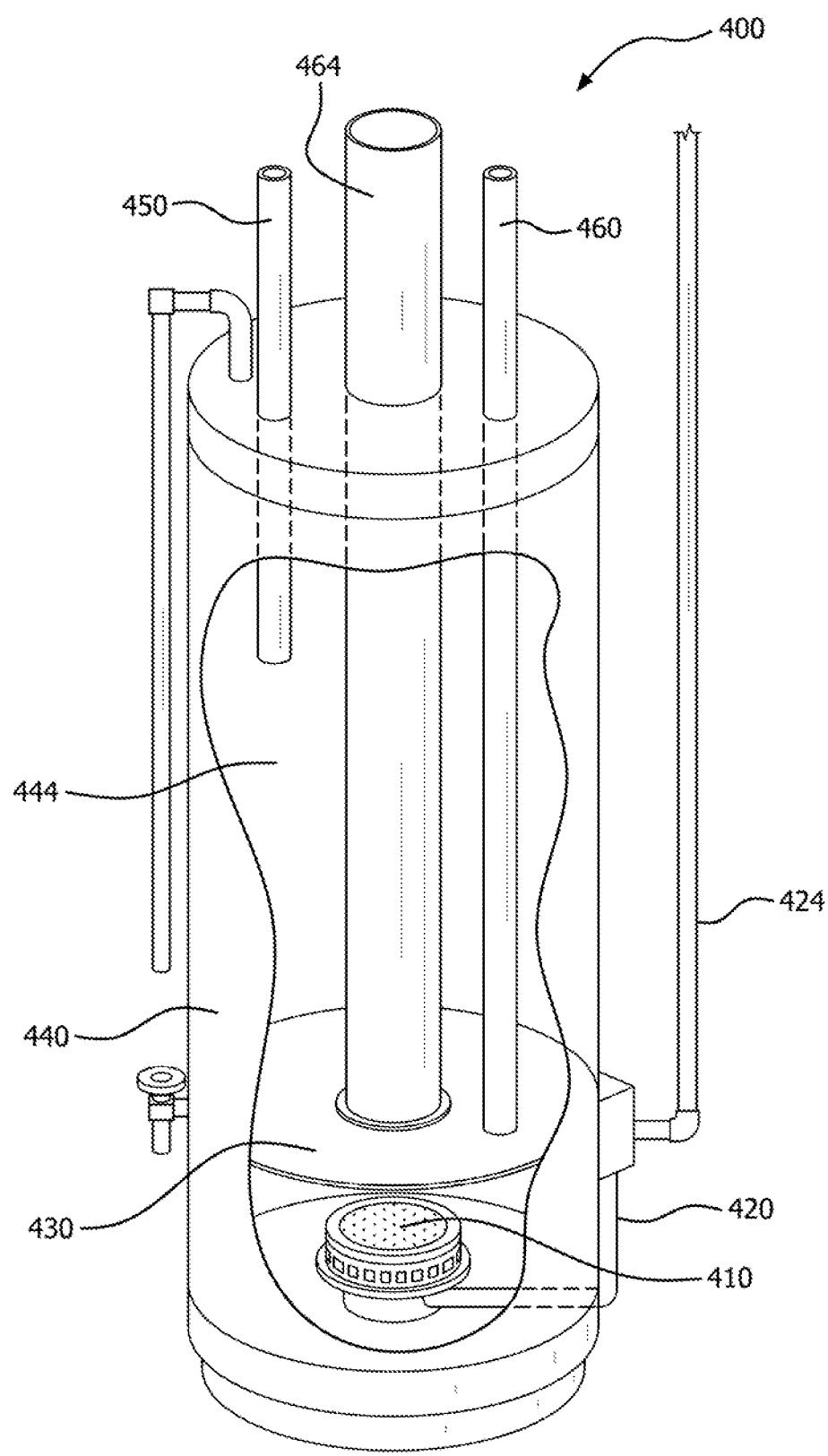
FIG. 15 is a perspective view, partially broken away, of a tank water heater with a burner according to the invention.

FIG. 15 is a perspective view, partially broken away, of a tank water heater 400 with a burner 410 according to the invention. The burner 410 receives oxygen-containing gas and hydrogen-containing fuel through an input port 420 and a supply conduit 424. A bottom plate 430 and sidewall 440 form a water tank with an interior 444 for containing water to be heated. Heated water is removed through hot water outlet 450 and cold water is supplied through cold water inlet 460. Burner combusted gas is exhausted through exhaust conduit 464.

Figure 16:
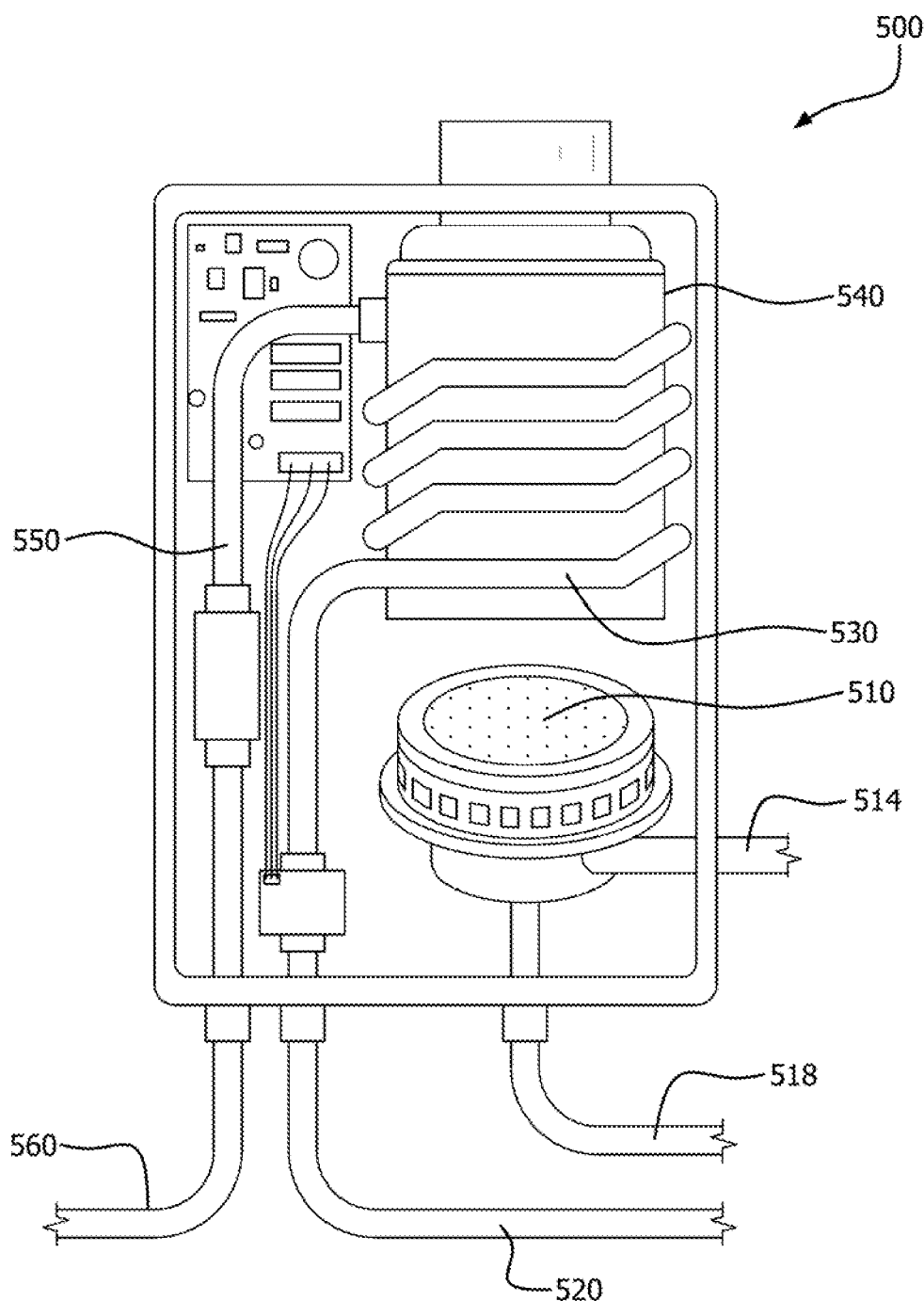
FIG. 16 is a perspective view, partially broken away, of an instant water heater with a burner according to the invention.

FIG. 16 is a perspective view, partially broken away, of an instant water heater system 500 with a burner 510 according to the invention. The burner 510 receives oxygen-containing gas through an input conduit 514, and hydrogen-containing fuel through an input conduit 518. Cold water is supplied through a cold water input conduit 520 and passes through coils 530 associated with heat exchanger 540. Hot water exits through an output conduit 550 communicating with an external hot water line 560.

Figure 17:
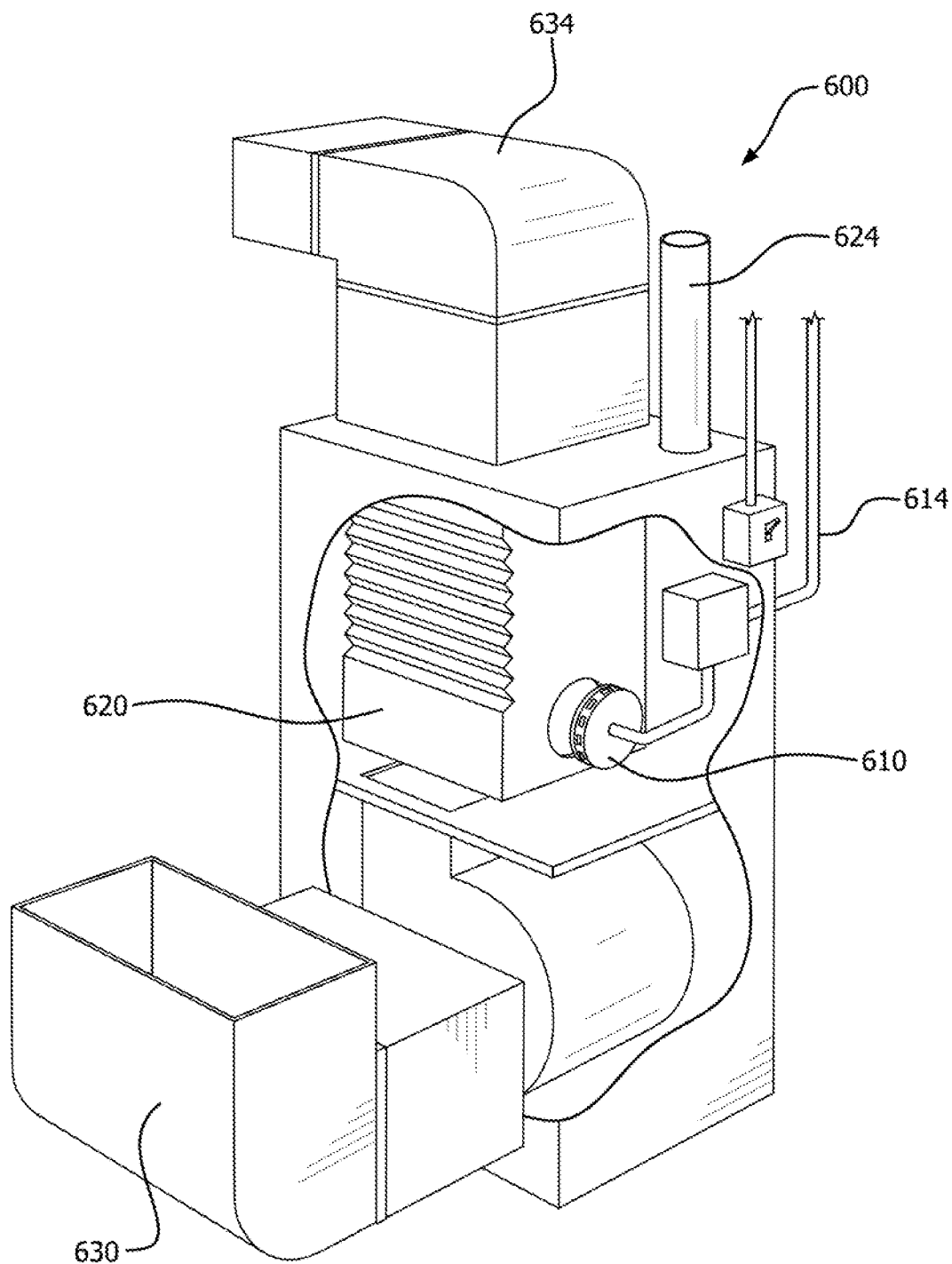
FIG. 17 is a perspective view, partially broken away and partially exploded, of a gas furnace system with a burner according to the invention.

FIG. 17 is a perspective view, partially broken away, of a gas furnace system 600 with a burner 610 according to the invention. The burner 610 receives a mixture of oxygen-containing gas and hydrogen-containing fuel through an input port 614 and exhausts combustion products through exhaust conduit 624. The burner 610 heats air within a heat exchanger 620 which receives cold air through a cold air return plenum 630. Heated air is exhausted through a warm air supply plenum 634.

Figure 18:
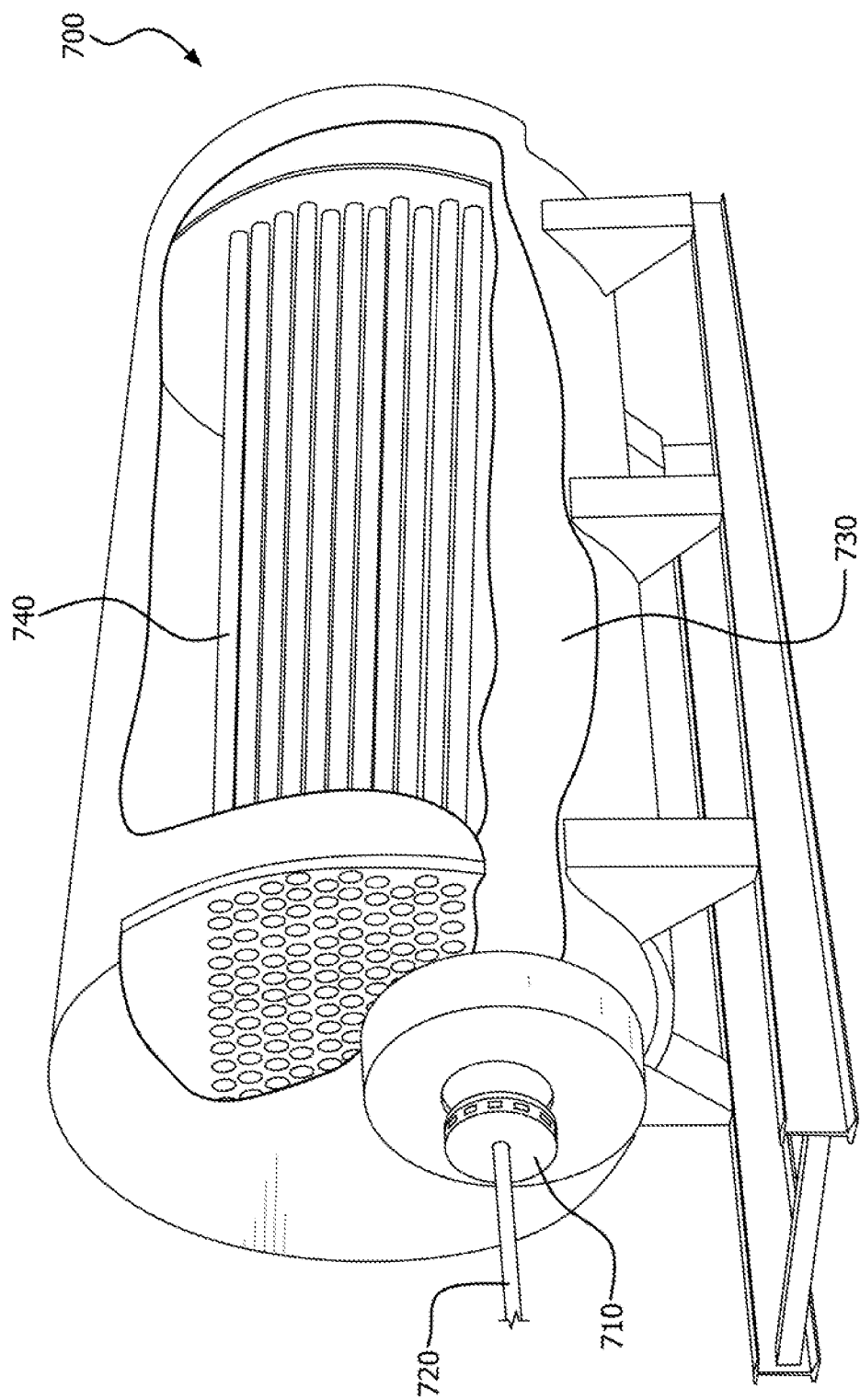
FIG. 18 is a perspective view, partially broken away, of a gas boiler with a burner according to the invention.

FIG. 18 is a perspective view, partially broken away, of a gas boiler 700 with a burner 710 according to the invention. The burner 710 receives oxygen-containing gas and hydrogen-containing fuel through a primary input port 720. The burner 710 heats gas flowing through shell 730 which is used to heat water or other liquid flowing through tubes 740.

Figure 19:
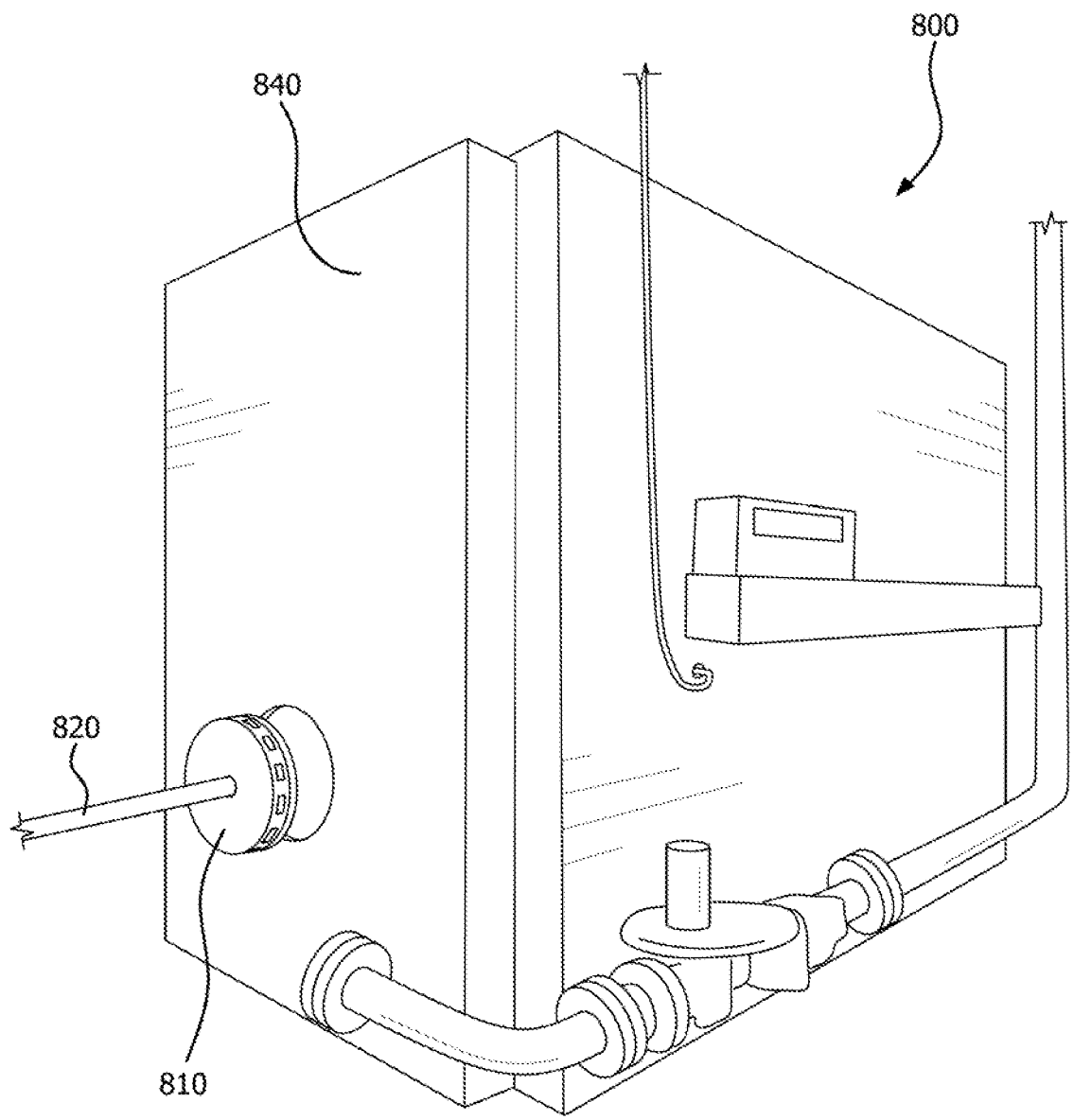
FIG. 19 is a perspective view, partially exploded, of an industrial gas fired process heater with a burner according to the invention.

FIG. 19 is a perspective view of an industrial gas fired process heater 800 with a burner 810 according to the invention. The burner receives oxygen-containing gas and hydrogen-containing fuel through a primary input port 820. The burner heats industrial gas flowing through the housing 840.

Figure 20:
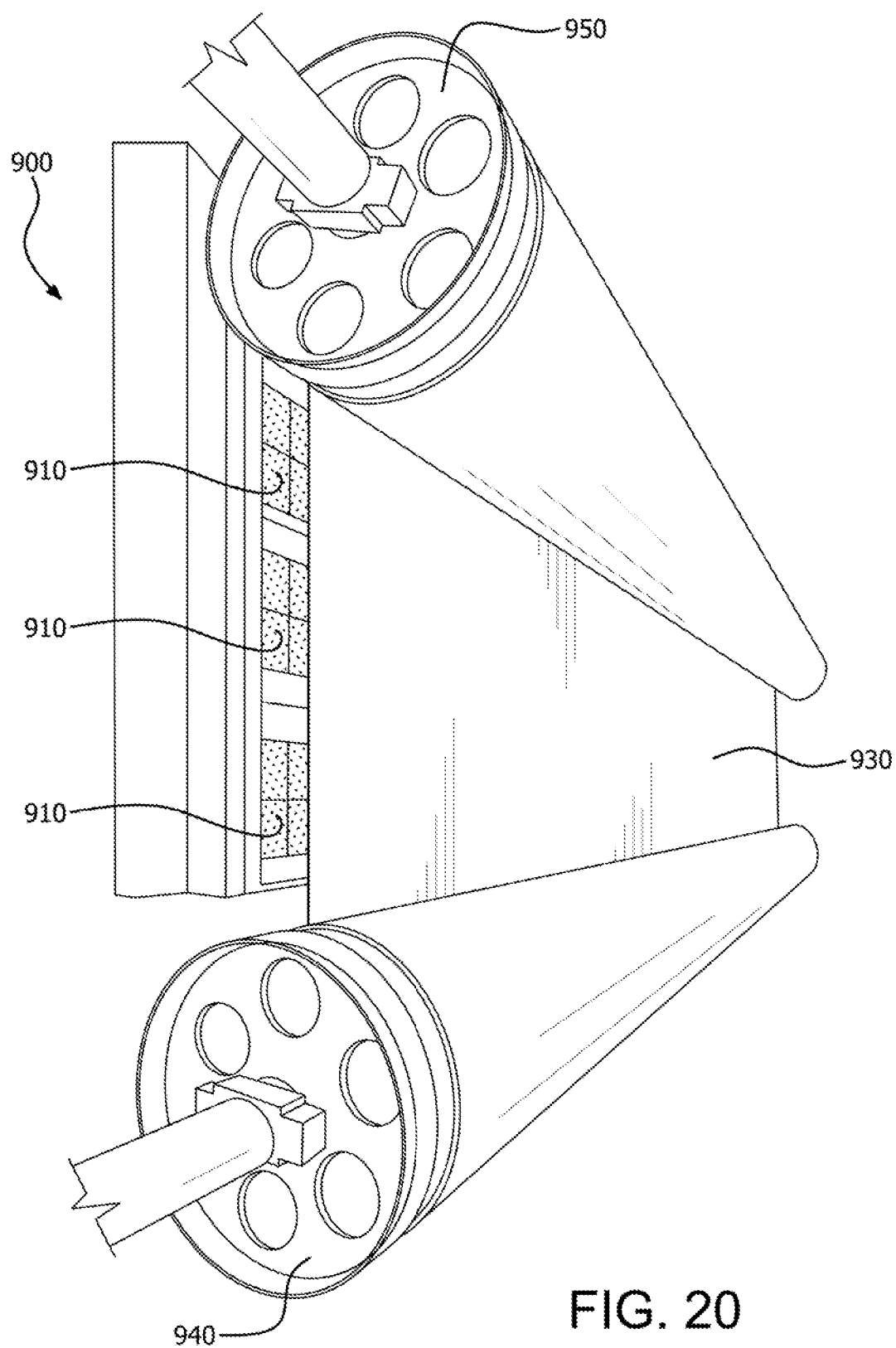
FIG. 20 is a perspective view of an industrial gas fired dryer with a burner according to the invention.

FIG. 20 is a perspective view of an industrial gas fired dryer 900 with burners 910 according to the invention. The burners 910 can be used to heat a variety of materials and structures, such as sheet 930 moving from roll 940 to roll 950 in a roll-to-roll process.

Figure 21:
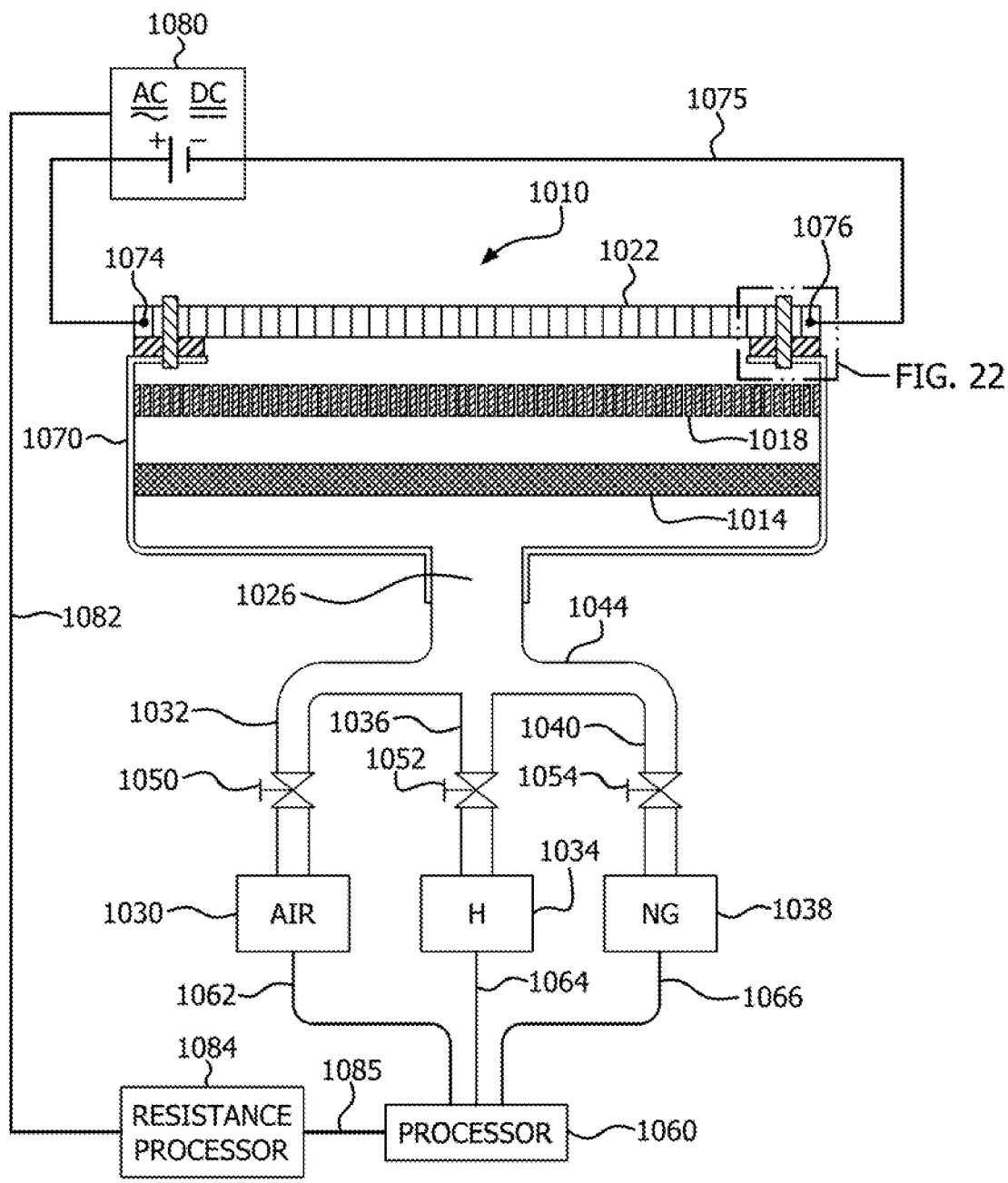
FIG. 21 is a schematic cross section of an alternative heating system according to the invention.
Figure 22:
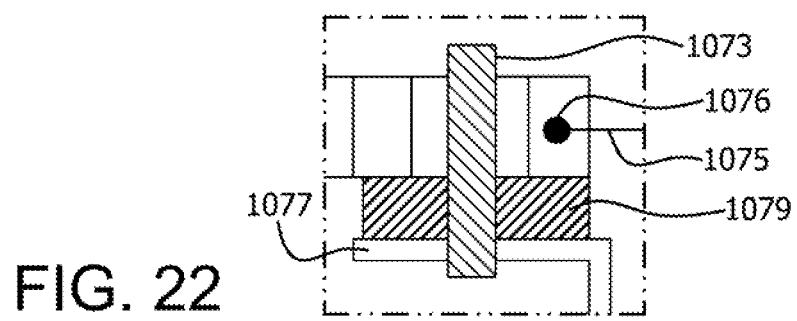
FIG. 22 is an expanded view of area FIG. 22 in FIG. 21.

There is shown in FIGS. 21-22 a burner 1010 according to an alternative embodiment. The burner 1010 includes a fuel distribution element 1014, a flashback arrestor element 1018, and a combustion element 1022. A primary input port 1026 is configured to receive hydrogen-containing fuel and primary oxygen-containing gas. The primary input port 1026 receives hydrogen-containing fuel and primary oxygen-containing gas from an oxygen-containing gas source 1030, a hydrogen gas source 1034, and a natural gas source 1038. The primary oxygen-containing gas source 1030 can communicate with an input conduit 1032 which can be controlled by a primary oxygen-containing gas flow control valve 1050. The hydrogen gas source 1034 can communicate with an input conduit 1036 and can be controlled by a hydrogen gas flow control valve 1052. The natural gas source 1038 can communicate with an input conduit 1040 and can be controlled by a natural gas flow control valve 1054. The oxygen-containing gas input conduit 1032, hydrogen gas input conduit 1036, and natural gas input conduit 1040 can communicate with a manifold 1044 which is fluidly connected to the primary input port 1026. Each of the primary oxygen-containing gas source 1030 and/or the primary oxygen-containing gas flow control valve 1050, the hydrogen gas source 1034 and/or the hydrogen gas flow control valve 1052, and the natural gas source 1038 and/or the natural gas flow control valve 1054 can be controlled by a processor 1060 through respective control lines 1062, 1064 and 1066. A housing 1070 for the burner 1010 can also be provided.

The combustion element 1022 in this embodiment is capable of both combustion of hydrogen-containing fuel and primary oxygen-containing gas, and also in another mode of operation of resistance heating. The combustion element 1022 as previously noted can comprise metals, and these metals are conductive and capable of resistance when properly energized. Electrical contacts 1074 and 1076 can be provided and connected by a suitable circuit 1075 to a DC or AC source 1080. As shown in FIG. 22, the combustion element 1022 can be secured to the housing 1070 by suitable structure such as screw or bolt 1073 which can engage a lip 1077 of the housing 1070 to support and engage the combustion element 1022. Insulation 1079 can be interposed between the combustion element 1022 and the lip 1077 to thermally and electrically insulate the combustion element 1022 from the burner housing 1070. The resistance heating can be controlled by a resistance processor 1084 which can communicate with the resistance power source 1080 by a control line 1082, The resistance processor 1084 can communicate with the combustion processor 1060 by a control line 1085, and the resistance processor 1084 and the combustion processor 1060 can be incorporated into a single combined processor.

Figure 23:
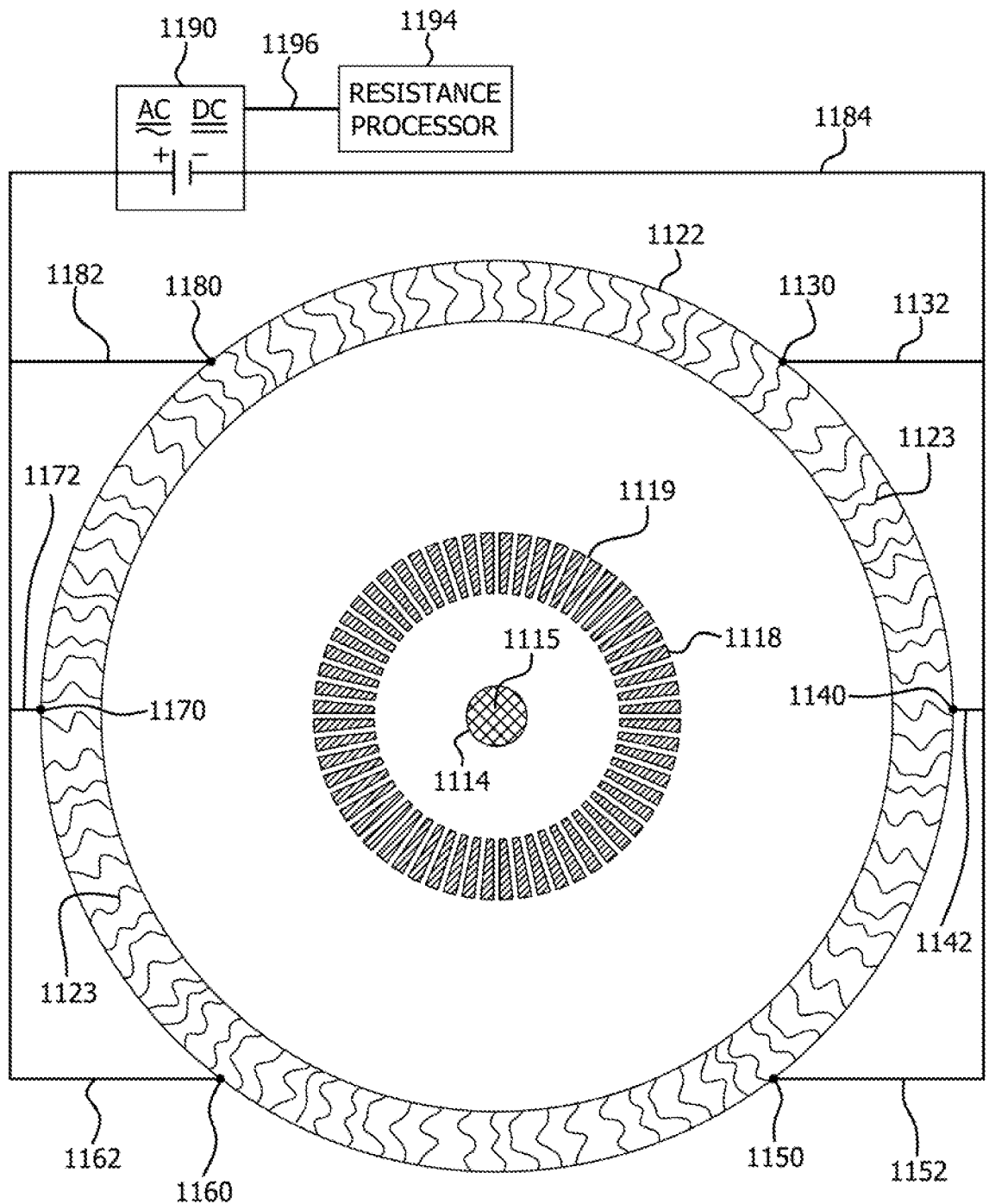
FIG. 23 is a cross section of an alternative concentric burner according to the invention.

There is shown in FIG. 23 an alternative embodiment similar to that shown in FIGS. 5-6, and thus includes a distribution element 1114 with channels 1115 and a cylindrical flashback arrestor element 1118 with channels 1119. The flashback arrestor element 1118 is surrounded by a combustion element 1122 with channels 1123. The flashback arrestor element 1118 can be concentric with the distribution element 1114, and can be generally tubular in shape. The combustion element 1122 can be concentric with the flashback arrestor element 1118, and can be generally tubular in shape. Gas connections similar to those described with respect to the embodiment shown in FIGS. 5-6 can be provided. The embodiment of FIG. 23 further comprises resistance heating. A number of electrical contacts and a power source are provided. Shown in FIG. 23 are contacts and respective power lines 1130/1132, 1140/1142, 1150/1152, 1160/1162, 1170/1172, and 1180/1182 which care connected to power circuit 1184. Power source 1190 which can be AC or DC provides power to the power circuit 1184. The resistance heating can be controlled by a resistance processor 1194 which can communicate with the power source 1190 thorough control line 1196.

A fuel flexible burner was invented, engineered, fabricated, and evaluated for applications in buildings and suitable for industrial heating. The key benefits targeted and accomplished included fuel flexibility, tolerance to high variable hydrogen concentrations, retrofittability, low cost, wide range of thermal power ratings, thermal cycling, reliability, energy efficiency, significant NOx emissions reduction and most importantly safety. The disclosed burner was operated over a wide range of Btu and hydrogen concentrations under multiple practical operating conditions, e.g., cold start, hot restart, fuel concentration variance. The burner demonstrated safe and reliable performance generating infrared heating energy in both atmospheric and forced air designs. The invention has been shown to work in a domestic cooking appliance integrated with standard components.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

I claim:

1. A burner comprising:
   a primary input port configured to receive hydrogen-containing fuel and primary oxygen-containing gas wherein the hydrogen-containing fuel comprises $H_2$ and hydrocarbon gas, such that the $H_2$ has a molar concentration of $0 < H_2 \leq 100\%$;
   a fuel-distribution element fluidly coupled with the input port, wherein the fuel-distribution element comprises a plurality of distribution openings configured to distribute the primary oxygen-containing gas and the hydrogen-containing fuel through the plurality of distribution openings;
   a flashback arrestor element disposed downstream from the fuel distribution element, wherein the flashback arrestor element comprises a plurality of flashback arrestor element channels configured to guide the primary oxygen-containing gas and hydrogen-containing fuel from the fuel-distribution element through the burner, wherein a mean width of the flashback arrestor element channels is smaller than a critical flame quench diameter of the hydrogen-containing fuel; and
   a combustion element disposed downstream from the flashback arrestor element and arranged to form an interface of the burner with ambient air, wherein the combustion element comprises a plurality of combustion element apertures configured to output the primary oxygen-containing gas and the hydrogen-based fuel from inside to outside of the burner, to cause the burner to produce a flame and/or infrared heat, wherein a mean width of the combustion element apertures is 2-4 times larger than the mean width of the flashback arrestor element channels, wherein the flashback arrestor element comprises ceramic or plastic materials, wherein the plastic materials comprise at least one selected from the group consisting of polyetherimide, polyether ether ketone, polyamide, polyimide, fluorinated ethylene propylene copolymer, polybenzimidazole, glass fiber reinforced polyphenylenesulfide, and polytetrafluoroethylene.

2. The burner of claim 1, wherein the mean width of the flashback arrestor element channels is from 200 to 1000 μm.

3. The burner of claim 1, wherein the combustion element comprises catalytic material to suppress undesired emissions.

4. The burner of claim 1, wherein the catalytic material comprises at least one selected from the group consisting of include platinum, palladium, rhodium, $Mn_2O_3$, $CuO$, $Cr_2O_3$, and $Mn_3O_4$.

5. A burner comprising:
   a primary input port configured to receive hydrogen-containing fuel and primary oxygen-containing gas wherein the hydrogen-containing fuel comprises $H_2$ and hydrocarbon gas, such that the $H_2$ has a molar concentration of $0 < H_2 \leq 100\%$;
   a fuel-distribution element fluidly coupled with the input port, wherein the fuel-distribution element comprises a plurality of distribution openings configured to distribute the primary oxygen-containing gas and the hydrogen-containing fuel through the plurality of distribution openings;
   a flashback arrestor element disposed downstream from the fuel distribution element, wherein the flashback arrestor element comprises a plurality of flashback arrestor element channels configured to guide the primary oxygen-containing gas and hydrogen-containing fuel from the fuel-distribution element through the burner, wherein a mean width of the flashback arrestor element channels is smaller than a critical flame quench diameter of the hydrogen-containing fuel; and
   a combustion element disposed downstream from the flashback arrestor element and arranged to form an interface of the burner with ambient air, wherein the combustion element comprises a plurality of combustion element apertures configured to output the primary oxygen-containing gas and the hydrogen-based fuel from inside to outside of the burner, to cause the burner to produce a flame and/or infrared heat, wherein a mean width of the combustion element apertures is 2-4 times larger than the mean width of the flashback arrestor element channels, wherein the combustion element comprises a material having an emissivity that is $\geq 0.75$.

6. The burner of claim 5, wherein the combustion element comprises a material having an emissivity of from 0.75 to 0.92.

7. The burner of claim 5, wherein the fuel-distribution element, the flashback arrestor element, and the combustion element are arranged in a planar configuration.

8. The burner of claim 5, wherein the fuel-distribution element, the flashback arrestor element, and the combustion element are arranged in a concentric configuration.

9. The burner of claim 8, wherein the concentric configuration is tubular.

10. The burner of claim 5, further comprising a burner housing, wherein the primary air input port, the fuel distribution element, the flashback arrestor element, and the combustion element are disposed in the burner housing.

11. The burner of claim 10, wherein the burner housing comprises at least one selected from the group consisting of metal and plastic.

12. The burner of claim 10, wherein the primary air input port, the fuel distribution element, comprise the flashback arrestor element comprises at least one selected from the group consisting of ceramic and plastic.

13. The burner of claim 10, wherein the burner housing, the fuel distribution element, the flashback arrestor element comprises plastic with upper working temperatures in the range of 180-360° C. and thermal conductivity in the range of 0.1-0.5 W/mK.

14. The burner of claim 10, wherein the burner housing, the fuel distribution element, the flashback arrestor element, comprises at least one selected from the group consisting of polyetherimide, polyether ether ketone, polyamide, polyimide, fluorinated ethylene propylene copolymer, polybenzimidazole, glass fiber reinforced polyphenylenesulfide, and polytetrafluoroethylene.

15. The burner of claim 5, wherein at least one selected from the group consisting of the fuel distribution element channels, the flashback arrestor channels, and the combustion element channels, are straight channels.

16. A burner comprising: a primary input port configured to receive hydrogen-containing fuel and primary oxygen-containing gas wherein the hydrogen-containing fuel comprises $H_2$ and hydrocarbon gas, such that the $H_2$ has a molar concentration of $0 < H_2 \leq 100\%$;
   a fuel-distribution element fluidly coupled with the input port, wherein the fuel-distribution element comprises a plurality of distribution openings configured to distribute the primary oxygen-containing gas and the hydrogen-containing fuel through the plurality of distribution openings;
   a flashback arrestor element disposed downstream from the fuel distribution element, wherein the flashback arrestor element comprises a plurality of flashback arrestor element channels configured to guide the primary oxygen-containing gas and hydrogen-containing fuel from the fuel-distribution element through the burner, wherein a mean width of the flashback arrestor element channels is smaller than a critical flame quench diameter of the hydrogen-containing fuel; and a combustion element disposed downstream from the flashback arrestor element and arranged to form an interface of the burner with ambient air, wherein the combustion element comprises a plurality of combustion element apertures configured to output the primary oxygen-containing gas and the hydrogen-based fuel from inside to outside of the burner, to cause the burner to produce a flame and/or infrared heat, wherein a mean width of the combustion element apertures is 2-4 times larger than the mean width of the flashback arrestor element channels;

a secondary flashback arrestor element disposed inside the burner downstream from the flashback arrestor element and upstream from the combustion element; and a secondary oxygen-containing gas input port configured to receive secondary oxygen-containing gas between the combustion element and the secondary flashback arrestor element, wherein the secondary flashback arrestor element comprises a plurality of secondary flashback arrestor element channels configured to guide the primary oxygen-containing gas and the hydrogen-based fuel from the flashback arrestor element through the burner, wherein a mean width of the secondary flashback arrestor element's channels is 1.5-2 times larger than the mean width of the flashback arrestor element channels, and wherein the secondary flashback arrestor element comprises ceramic materials.

17. The burner of claim 16, wherein the CPSI of the secondary flashback arrestor element channels is between 100-300 CPSI.

18. The burner of claim 16, wherein the mean width of the secondary flashback arrestor channels is between 1.5-2 times the mean width of the flashback arrestor element channels.

19. The burner of claim 16, wherein the thickness of the secondary flashback arrestor element is from 0.25 and 0.5 inches.

20. The burner of claim 5, wherein the distance between the combustion element and the flashback arrestor element is from 0.5 to 1 inches.

21. The burner of claim 16, wherein the distance between the flashback arrestor element and the secondary flashback arrestor element is from 0.25 to 0.5 inches.

22. The burner of claim 5, wherein the hydrocarbon gas comprises at least one selected from the group consisting of natural gas, methane, propane, butane and biogas.

23. The burner of claim 5, wherein the burner is attached to at least one selected from the group consisting of stoves, hot water tanks, furnaces, ovens, boilers, industrial heating systems, and industrial drying systems.

24. The burner of claim 5, wherein the combustion element comprises an electrically conductive material, and further comprising electrical contacts electrically connected to the combustion element;
   an electrical power circuit connected to the electrical contacts; and,
   an electrical power source for providing power to the electrical power circuit.

25. The burner of claim 24, further comprising a processor for controlling the flow of power through the electrical power circuit.

26. The burner of claim 5, wherein the oxygen-containing gas is air.

27. The burner of claim 5, wherein the flashback arrestor element channels have a mean width of 200-600 pm.

28. The burner of claim 5, wherein the flashback arrestor element channels in cross section have a shape that is at least one selected from the group consisting of square, circular, pentagonal or triangular.

29. The burner of claim 5, wherein the length of the flashback arrestor element channels is from 0.25 to 0.5 inches.

30. The burner of claim 5, wherein the flashback arrestor element comprises a ceramic with a thermal conductivity of from 1.5 to 10 W/mK or plastic with a thermal conductivity of from 0.1 to 0.5 W/mK.

31. The burner of claim 5, wherein cells per square inch (CPSI) for the flashback arrestor element channels is 200-400 CPSI.

32. The burner of claim 5, wherein the combustion element comprises surface catalytic metal oxides.

33. The burner of claim 32, wherein the surface catalytic metal oxides comprise at least one selected from the group consisting of NiCrAl, NiCr, FeCrAl, and FeNi.

34. The burner of claim 5, wherein the thickness of the combustion element is from 1 mm to 2 mm.

* * * * *